(12) United States Patent
Jung et al.

(10) Patent No.: US 11,244,422 B2
(45) Date of Patent: Feb. 8, 2022

(54) IMAGE PROCESSING APPARATUS AND IMAGE PROCESSING METHOD THEREFOR

(71) Applicant: Samsung Electronics Co., Ltd., Gyeonggi-do (KR)

(72) Inventors: Il-Hoe Jung, Seoul (KR); In-Su Yu, Seoul (KR); Jin-Ho Lim, Gyeonggi-do (KR); Byung-Po Choi, Gyeonggi-do (KR); Yoon-Joo Kim, Seoul (KR); Byung-Hyun Ahn, Seoul (KR); Jae-Eun Yang, Gyeonggi-do (KR); Dong-Hyun Yeom, Gyeonggi-do (KR)

(73) Assignee: Samsung Electronics Co., Ltd

( * ) Notice: Subject to any disclaimer, the term of this patent is extended or adjusted under 35 U.S.C. 154(b) by 348 days.

(21) Appl. No.: 16/463,980

(22) PCT Filed: Nov. 27, 2017

(86) PCT No.: PCT/KR2017/013619
§ 371 (c)(1),
(2) Date: May 24, 2019

(87) PCT Pub. No.: WO2018/097682
PCT Pub. Date: May 31, 2018

(65) Prior Publication Data
US 2020/0388002 A1    Dec. 10, 2020

(30) Foreign Application Priority Data
Nov. 25, 2016    (KR) .......................... 10-2016-0158505

(51) Int. Cl.
*G06T 3/00*     (2006.01)
*H04N 13/167*     (2018.01)
(Continued)

(52) U.S. Cl.
CPC .......... *G06T 3/0062* (2013.01); *G06T 3/0018* (2013.01); *H04N 13/111* (2018.05);
(Continued)

(58) Field of Classification Search
None
See application file for complete search history.

(56) References Cited

U.S. PATENT DOCUMENTS 5,923,334 A * 7/1999 Luken .................... G06T 15/205
                                                      345/423
9,519,995 B2 * 12/2016 Narukawa ............... G06T 17/20
(Continued)

FOREIGN PATENT DOCUMENTS

CN         105791882        7/2016
EP          1 162 830        12/2001
(Continued)

OTHER PUBLICATIONS

European Search Report dated Aug. 9, 2019 issued in counterpart application No. 17874743.2-1208, 8 pages.
(Continued)

*Primary Examiner* — Samah A Beg
(74) *Attorney, Agent, or Firm* — The Farrell Law Firm, P.C.

(57) ABSTRACT

An image processing apparatus is disclosed. The image processing apparatus includes a storage unit; a transceiver; and a processor for controlling the storage unit to store an input frame including a plurality of image areas having preset arrangement attributes and metadata including the preset arrangement attributes, control the transceiver to receive viewing angle information, and control the transceiver to transmit the metadata and image data of at least one image region corresponding to the viewing angle information among the plurality of image regions by using at least
(Continued)

one of the plurality of transmission channels matched with the plurality of image regions.

13 Claims, 26 Drawing Sheets

(51) Int. Cl.
*H04N 13/178* (2018.01)
*H04N 13/194* (2018.01)
*H04N 13/111* (2018.01)

(52) U.S. Cl.
CPC ......... *H04N 13/167* (2018.05); *H04N 13/178* (2018.05); *H04N 13/194* (2018.05)

(56) References Cited

U.S. PATENT DOCUMENTS

| | | | |
|---|---|---|---|
| 10,692,274 B2* | 6/2020 | Lim | H04N 13/232 |
| 2012/0206565 A1 | 8/2012 | Villmer | |
| 2013/0148026 A1* | 6/2013 | Jeong | H04N 21/4622 348/570 |
| 2014/0218354 A1 | 8/2014 | Park et al. | |
| 2016/0073173 A1* | 3/2016 | Na | H04N 21/234327 370/315 |
| 2016/0105658 A1* | 4/2016 | Choo | G06F 3/013 348/40 |
| 2016/0112704 A1 | 4/2016 | Grange et al. | |
| 2016/0112713 A1 | 4/2016 | Russell | |
| 2016/0156912 A1 | 6/2016 | Alshina et al. | |
| 2017/0236323 A1* | 8/2017 | Lim | H04N 21/23614 345/419 |
| 2017/0358126 A1* | 12/2017 | Lim | H04N 13/243 |
| 2017/0374375 A1* | 12/2017 | Makar | H04N 19/597 |
| 2018/0061002 A1* | 3/2018 | Lee | H04N 19/88 |
| 2018/0091577 A1 | 3/2018 | Park et al. | |
| 2018/0324355 A1 | 11/2018 | Wang | |
| 2020/0058165 A1* | 2/2020 | Choi | G06T 1/20 |
| 2020/0177916 A1* | 6/2020 | Niamut | A01C 3/023 |
| 2020/0388002 A1* | 12/2020 | Jung | H04N 13/178 |
| 2021/0176391 A1* | 6/2021 | Lim | H04N 13/282 |

FOREIGN PATENT DOCUMENTS

| | | |
|---|---|---|
| KR | 101230546 | 2/2013 |
| KR | 1020140100656 | 8/2014 |
| KR | 1020160043786 | 4/2016 |
| KR | 1020160125708 | 11/2016 |
| KR | 1020170141081 | 12/2017 |
| WO | WO 2015/184416 | 12/2015 |

OTHER PUBLICATIONS

Systems, "WD on ISO/IEC 23000-20 Omnidirectional Media Application Format", ISO/IEC JTC1/SC29/WG11 N16439, XP030023111, Oct. 2016, 55 pages.
European Search Report dated Sep. 4, 2020 issued in counterpart application No. 17874743.2-1208, 8 pages.
PCT/ISA/210 Search Report issued on PCT/KR2017/013619 pp. 5.
PCT/ISA/237 Written Opinion issued on PCT/KR2017/013619, pp. 6.

* cited by examiner

| Image area | Channel |
|---|---|
| 1 | ch. 1 |
| 2 | ch. 2 |
| 3 | ch. 3 |
| 4 | ch. 4 |
| 5 | ch. 5 |
| 6 | ch. 6 |
| 7 | ch. 7 |
| 8 | ch. 8 |

① 010001010....
011001010....
010011010....
010100000....

IMAGE PROCESSING APPARATUS AND IMAGE PROCESSING METHOD THEREFOR

PRIORITY

This application is a National Phase Entry of PCT International Application No. PCT/KR2017/013619, which was filed on Nov. 27, 2017, and claims priority to Korean Patent Application No. 10-2016-0158505, which was filed on Nov. 25, 2016, the contents of each of which are incorporated herein by reference.

BACKGROUND

1. Field

The disclosure generally relates to an image processing method and, more particularly, to an image processing apparatus for rendering an image and an image processing method of the same.

2. Description of the Related Art

An omni-directional image camera system refers to a camera system capable of capturing images in omni-directions at 360 degrees from a fixed point of sight. The omni-directional image is an image including all of views from a viewer spinning in place and views from a viewer tilting his/her head back or lowering his/her head. The omni-directional image camera system installs a special mirror such as a hyperbolic mirror or a special lens such as a fisheye lens in a camera or uses a plurality of cameras to capture images in omni-directions.

Research on an omni-directional video coding method of transmitting image information generated by the omni-direction image camera system to another electronic device has been actively conducted.

Particularly, methods of more efficiently compressing omni-directional images (three-dimensional images) using a video codec such as MPEG-4 or H.264 have been researched. Representatively, there is a method of reducing an amount of data on a compressed image by mapping the omni-directional image to a two-dimensional plane image. The method of mapping the omni-directional image includes, for example, a cartographical projection method or a polygonal projection method of performing two-dimensional plane mapping in consideration of camera attributes such as calibration parameters.

However, the omni-directional image is a large-capacity image captured in all directions and thus overloading of a system for transmitting and receiving the image (for example, excessive bandwidth resource use and image processing speed increase) cannot be sufficiently resolved through the compression method.

Further, there is a problem of distortion generated in a process of mapping the three-dimensional spatial image included in the omni-directional image to the two-dimensional plane image.

Accordingly, there is a need for further effort to find a method of minimizing the overloading of the system for transmitting and receiving the omni-directional image and the distortion of the omni-directional image while maintaining a Quality of Service (QoS) from the viewpoint of a user of the omni-directional image.

SUMMARY

The disclosure has been made according to the aforementioned necessity and an aspect of the disclosure is to provide an image processing apparatus for minimizing consumption of system bandwidth resources while reducing image distortion when processing an omni-direction image and an image processing method of the same.

In accordance with an aspect of the disclosure, an apparatus for processing images is provided. The apparatus includes: a storage unit configured to store an input frame including a plurality of image areas having preset arrangement attributes and metadata including the preset arrangement attributes; a transceiver configured to receive viewing angle information and transmit the metadata; and a processor configured to control the transceiver to transmit image data of at least one image area corresponding to the viewing angle information among the plurality of image areas through at least one of a plurality of transmission channels that match the plurality of image areas, respectively.

In accordance with another aspect of the disclosure, an apparatus for processing images is provided. The apparatus includes: a sensor unit configured to sense a field of view of a user; a transceiver configured to transmit viewing angle information generated based on the sensed field of view of the user and receive metadata including preset arrangement attributes of a plurality of image areas included in an image frame; and a processor configured to receive image data of at least one image area corresponding to the viewing angle information among the plurality of image areas through at least one of a plurality of transmission channels that match the plurality of image areas, respectively, map the received image data to faces corresponding to the at least one image area among faces of a three-dimensional polyhedron, based on the metadata, and render an output frame.

In accordance with another aspect of the disclosure, a method of processing images is provided. The method includes: receiving viewing angle information; transmitting metadata including preset arrangement attributes of a plurality of image areas included in an input frame; and transmitting image data of at least one image area corresponding to the viewing angle information among the plurality of image areas through at least one of a plurality of transmission channels that match the plurality of image areas, respectively.

In accordance with another aspect of the disclosure, a method of processing images is provided. The method includes: sensing a field of view of a user; transmitting viewing angle information generated based on the sensed field of view of the user; receiving metadata including preset arrangement attributes of a plurality of image areas included in an image frame; receiving image data of at least one image area corresponding to the viewing angle information among the plurality of image areas through at least one of a plurality of transmission channels that match the plurality of image areas, respectively; and mapping the received image data to faces corresponding to the at least one image area among faces of a three-dimensional polyhedron, based on the metadata and rendering an output frame.

According to the disclosure, it is possible to minimize image distortion and wasting of bandwidth resources in processing of an omni-directional image.

DETAILED DESCRIPTION

Figure 1:
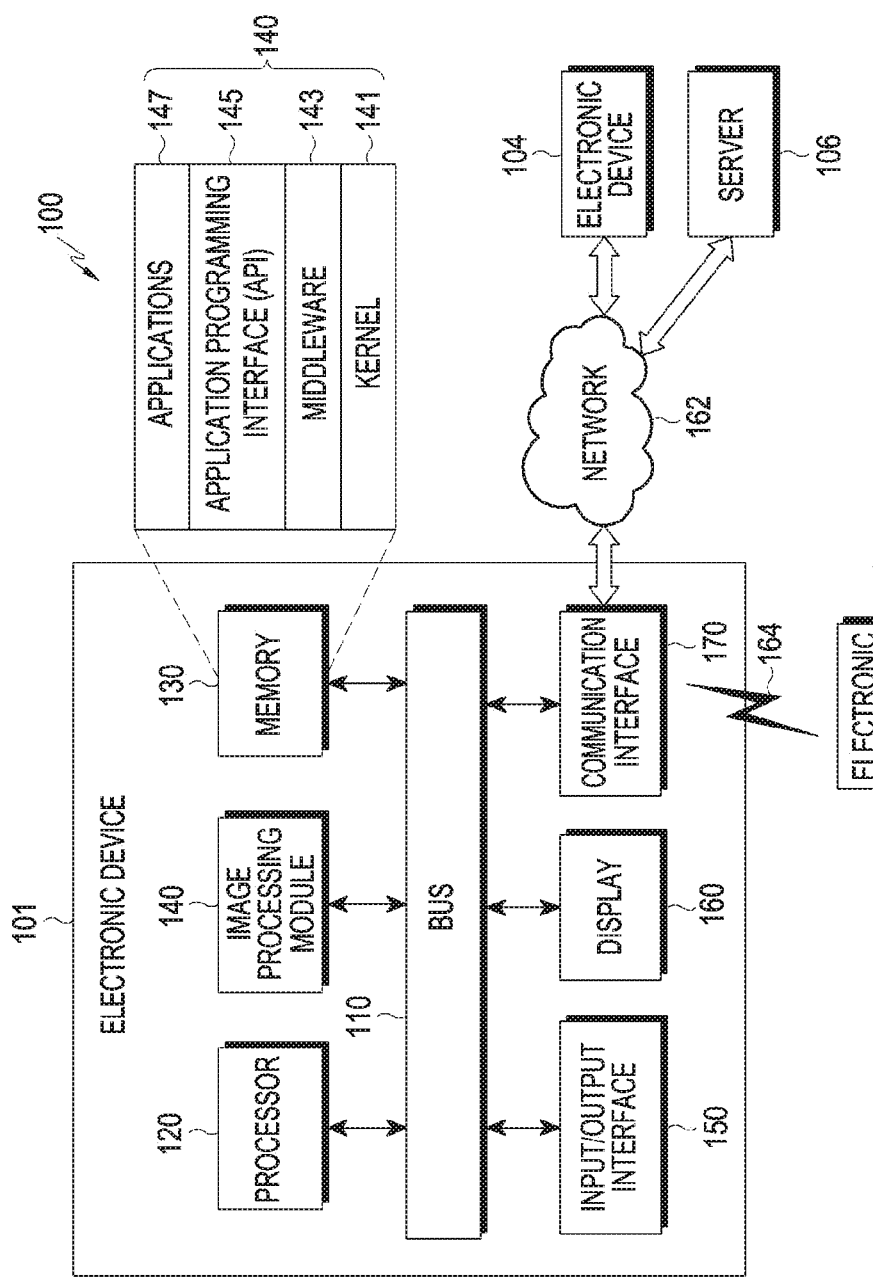
FIG. 1 illustrates a network environment according to various embodiments of the disclosure.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A and/or B", or "one or more of A and/or B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the terms defined herein may not be construed to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., a piece of electronic clothing), a body-mounted type (e.g., a skin pad or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship or a gyro-compass), avionics, a security device, an automotive head unit, a robot for home or industry, an Automatic Teller's Machine (ATM) in banks, a Point Of Sale (POS) in a shop, or an Internet of things (IoT) device (e.g., a light bulb, various sensors, an electric or gas meter, a sprinkler device, a fire alarm, a thermostat, a streetlamp, a toaster, a sporting good, a hot water tank, a heater, a boiler, etc.).

According to some embodiments, the electronic device may include at least one of a part of a piece of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology.

Various embodiments proposed by the disclosure provide a method of transmitting and receiving omni-directional images mapped to a two-dimensional image through multiple channels in order to efficiently transmit and receive the omni-directional images.

Hereinafter, an electronic device according to various embodiments will be described with reference to the accompanying drawings. In the disclosure, the term user may refer to a person using an electronic device or a device (for example, an artificial intelligence electronic device) using an electronic device.

FIG. 1 illustrates a network environment 100 according to various embodiments of the disclosure.

Referring to FIG. 1, an electronic device 101 within the network environment 100 may include a bus 110, a processor 120, a memory 130, an image processing module 140, an input/output interface 150, a display 160, and a communication interface 170. According to an embodiment, the electronic device 101 may omit at least one of the above elements, or may further include other elements.

The bus 110 may include, for example, a circuit for connecting the elements 120 to 170 and transmitting a communication signal (for example, a control message and/or data) between the elements 120 to 170.

The processor 120 may include one or more of a Central Processing Unit (CPU), an Application Processor (AP), a Communication Processor (CP), or an Image Signal Processor (ISP). The processor 120 may control, for example, one or more different elements of the electronic device 101, perform image signal processing, and/or process calculations or data related to communication.

When the ISP is included in the processor 120, the processor 120 may acquire an omni-directional image from the memory 130 or an external electronic device. In this case, the processor 120 may map the omni-directional image to a two-dimensional image through, for example, an Octahedron Projection (OHP) scheme. The two-dimensional image may include a plurality of image areas having preset arrangement attributes (attributes indicating a mapping relation between an image of each face of a three-dimensional polyhedron and each of a plurality of image areas).

For example, when viewing angle information of the user is received from the communication interface 170, the processor 120 may determine and transmit at least one image area corresponding to viewing angle information from among a plurality of image areas through at least one of a plurality of transmission channels mapped to a plurality of image areas (areas of a two-dimensional image to which each face of a regular octahedron corresponding to each part of a three-dimensional image is mapped).

In this case, the processor 120 may determine an importance of the plurality of image areas on the basis of the viewing angle information. For example, it is determined that an area located at the center of the viewing angle of the user has a high importance. In this case, the processor 120 may configure an important area to have a high quality (for example, Frame Per Second (FPS), resolution) and a less important area to have a low quality, and transmit the corresponding areas.

Meanwhile, the electronic device 101 may further include a sensor for sensing a field of view of the user. In this case, the processor 120 may sense the field of view of the user. The processor 120 may sense the field of view of the user and transmit a two-dimensional image to which omni-directional images are mapped to another electronic device.

Meanwhile, the processor 120 may receive at least one image area through a plurality of transmission channels. Further, the processor 120 may perform rendering using at least one received image area.

For example, a plurality of transmission channels may be mapped to a plurality of respective image areas having preset arrangement attributes. In this case, the processor 120 may receive at least one image area corresponding to viewing angle information among the plurality of image areas from the plurality of transmission channels. Accordingly, the processor 120 may map at least one image area to corresponding faces among the faces of a polyhedron and render an output frame.

In another example, the processor 120 may further receive metadata. The metadata may include at least one piece of unique Identifier (ID) information of content, information on the plurality of transmission channels, type information of a polyhedron corresponding to the plurality of image areas, matching information between the plurality of transmission channels and the plurality of image areas, and quality information of at least one image data among the plurality of image areas corresponding to the viewing angle information. In this case, the processor 120 may map at least one image area to corresponding faces of the faces of the polyhedron on the basis of the metadata and render the output frame.

In another example, the processor 120 may determine an importance of the plurality of image areas and perform rendering on the basis of the importance. The processor 120 may render an image area having a high importance with a high quality and an image area having a relatively or absolutely low importance with a low quality. For example, the processor 120 may use quality information included in the metadata in order to perform rendering according to the quality.

The memory 130 may include volatile and/or non-volatile memory. The memory 130 may store, for example, instructions or data relevant to at least one other element of the electronic device 101. According to various embodiments, the memory 130 may store software and/or a program 180. The program 180 may include, for example, a kernel 181, middleware 183, an Application Programming Interface (API) 185, and/or applications (or "apps") 187. At least some of the kernel 181, the middleware 183, and the API 185 may be referred to as an operating system (OS).

According to various embodiments, the memory 130 may store metadata and/or compressed or non-compressed image data in an area designated by the processor 120. For example, the memory 130 may store metadata as at least part of the target image.

The memory 130 may read an image (a two-dimensional image to which omni-directional images are mapped) and/or metadata stored in a predetermined area and provide the same to the processor 120 in response to a request from the processor 120.

When the processor 120 does not include the ISP, the electronic device 101 may separately include the image processing module 140. In this case, the image processing module 140 may perform the operation of the processor 120 on behalf of the processor 120.

Although FIG. 1 illustrates the image processing module 140 as an element independent from the processor 120 and the memory 130, various embodiments are not limited thereto. The image processing module 140 may be embodied by being integrated with the processor 120, or may be stored in the memory in a software form, and thus, may be embodied in a form that may be executed in the processor 120. Further, the image processing module 140 may be implemented, for example, while being distributed to the processor 120 and the memory 130. In this case, the image processing module 140 may perform an operation for generating metadata, and the processor 120 may be implemented to map omni-directional images to a two-dimensional image.

The kernel 181 may control or manage system resources (for example, the bus 110, the processor 120, or the memory 130) used for executing an operation or function implemented by other programs (for example, the middleware 183, the API 185, or the application 187). Furthermore, the kernel 181 may provide an interface through which the middleware 183, the API 185, or the application programs 187 may access the individual elements of the electronic device 101 to control or manage the system resources.

The middleware 183 may function as, for example, an intermediary for allowing the API 185 or the application programs 187 to communicate with the kernel 181 to exchange data.

Furthermore, the middleware 183 may process one or more task requests, which are received from the application programs 187, according to priorities thereof. For example, the middleware 183 may assign priorities for using the system resources (for example, the bus 110, the processor 120, the memory 130, or the like) of the electronic device 101, to at least one of the application programs 187. For example, the middleware 183 may perform scheduling or load balancing for one or more task requests by processing the one or more task requests according to priorities assigned to at least one application.

The API 185, which is an interface through which the applications 187 control functions provided from the kernel 181 or the middleware 183, may include, for example, at least one interface or function (for example, instruction) for file control, window control, image processing, text control, or the like.

The input/output interface 150 may function as, for example, an interface that can forward instructions or data, which are input from a user or an external device, to the other element(s) of the electronic device 101. Furthermore, the input/output interface 150 may output commands or data received from the other element(s) of the electronic device 101 to a user or an external device. For example, the input/output interface 150 may include a plurality of image sensors having different characteristics. The input/output interface 150 may transmit images captured by a plurality of image sensors to the image processing module 140, the memory 130, the display 160, and the communication interface 170 through the bus 110. The captured images may have different image characteristics. This may be due to a difference in the image sensor characteristic or a condition set for the photographing.

The display 160 may include, for example, a liquid-crystal display (LCD), a light-emitting diode (LED) display, an organic light-emitting diode (OLED) display, a micro-electro-mechanical systems (MEMS) display, or an electronic paper display. The display 160 may display, for example, the rendered output frame or a preview image.

The communication interface 170 may set, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, long-term evolution (LTE), LTE-advanced (LTE-A), code division multiple access (CDMA), wideband CDMA (WCDMA), universal mobile telecommunications system (UMTS), WiBro (wireless broadband), global system for mobile communications (GSM), or the like, as a cellular communication protocol. In addition, the wireless communication may include, for example, short range communication 164. The short-range communication 164 may include at least one of, for example, Wi-Fi, Bluetooth, Near Field Communication (NFC), Magnetic Stripe Transmission (MST), and Zigbee. The wireless communication may use, for example, a Global Positioning System (GPS) or a Global Navigation Satellite System (GNSS). The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to various embodiments, the server 106 may include a group of one or more servers. According to various embodiments, all or some of the operations performed in the electronic device 101 may be performed in another electronic device or a plurality of electronic devices (for example, the electronic devices 102 and 104 or the server 106). According to various embodiments, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver information about the result of the execution to the electronic device 101. The electronic device 101 may provide the received result as it is, or may additionally process the received result to provide the requested functions or services. To this end, for example, cloud-computing, distributed-computing, or client-server-computing technology may be used.

Figure 2:
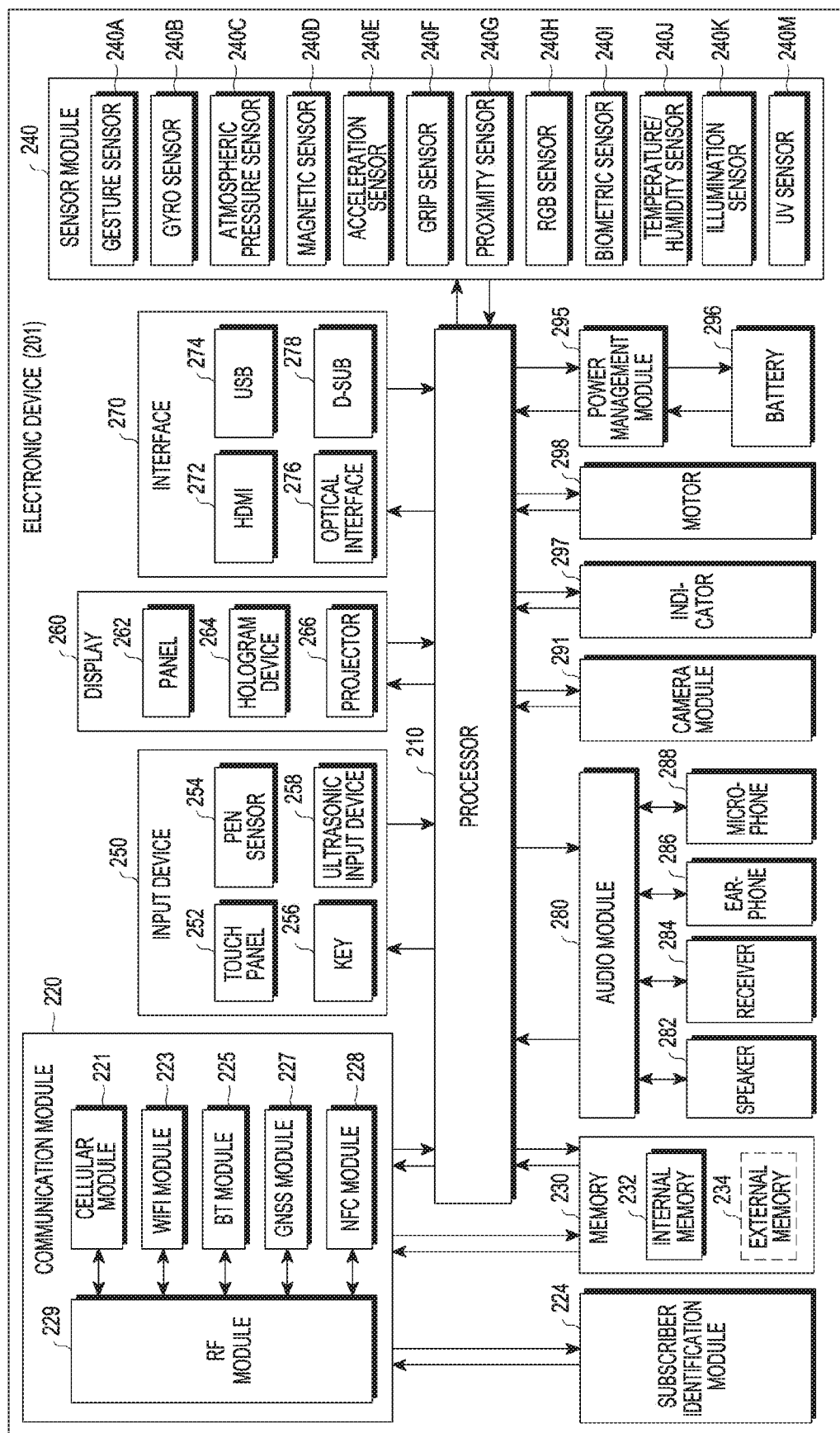
FIG. 2 illustrates the configuration of an electronic device according to various embodiments of the disclosure.

FIG. 2 illustrates the configuration of an electronic device 201 according to various embodiments of the disclosure.

Referring to FIG. 2, the electronic device 201 may include, for example, the entirety or a part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be embodied, for example, as a System on Chip (SoC). According to various embodiments, the processor 210 may further include a Graphic Processing Unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory), process the loaded instructions or data, and store the result data in the non-volatile memory.

According to various embodiments proposed by the disclosure, the processor 210 may be configured to perform all operations performed by the processor 120 and/or the image processing module 140 described with reference to FIG. 1. Since a detailed description thereof is the same as that made with reference to FIG. 1, an overlapping description will be omitted.

The communication module 220 may have a configuration identical or similar to that of the communication interface 170 illustrated in FIG. 1. The communication module 220 may include, for example, a cellular module 221, a Wi-Fi module 223, a BT module 225, a GPS module 227, an NFC module 228, and a Radio Frequency (RF) module 229.

The cellular module 221 may provide, for example, a voice call, a video call, a text-message service, an Internet service, or the like via a communication network. According to various embodiments of the disclosure, the cellular module 221 may identify or authenticate an electronic device 201 in the communication network using a subscriber identification module (for example, a Subscriber Identity Module (SIM) card) 224. According to various embodiments, the cellular module 221 may perform at least some of the functions that the processor 210 may provide. According to various embodiments, the cellular module 221 may include a CP.

For example, each of the Wi-Fi module 223, the BT module 225, the GPS module 227, and the NFC module 228 may include a processor for processing data transmitted/received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a power amplifier module (PAM), a frequency filter, a low-noise amplifier (LNA), an antenna, or the like. According to various embodiments, at least one of the cellular module 221, the Wi-Fi module 223, the BT module 225, the GPS module 227, and the NFC module 228 may transmit/receive an RF signal through a separate RF module.

According to various embodiments, the communication module 220 may be designed to perform the same operation performed by the communication interface 170 illustrated in FIG. 1. That is, the communication module 220 may make a request for compressing a target image to an external electronic device in response to the control of the processor 210. To this end, the communication module 220 may provide a target image (a two-dimensional image to which an omni-directional image is mapped) and/or metadata corresponding to the target image to the external electronic device. The communication module 220 may receive a compressed image provided from the external electronic device and transfer the received compressed image to the processor 210.

The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The memory 230 may record a target image and/or metadata corresponding to the target image in a predetermined area in response to the control of the processor 210. The memory 230 may read a particular target image and/or metadata corresponding to the particular target image in response to the control of the processor 210 and provide the read particular target image and/or metadata corresponding to the particular target image to the processor 210.

The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 234 may be functionally and/or physically connected to the electronic device 201 through various interfaces.

The sensor module 240 may measure, for example, a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210, in order to control the sensor module 240, while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is part of a touch panel or is separated from a touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 may include a panel 262, a hologram device 264, or a projector 266.

The panel 262 may have a configuration that is the same as, or similar to, that of the display 160 illustrated in FIG. 1. The panel 262 may be implemented to be, for example, flexible, transparent, or wearable. The panel 262 and the touch panel 252 may be configured as a single module.

According to various embodiments, the panel 262 may include at least one sensor. For example, the panel 262 may include a pressure sensor (or a force sensor (interchangeably used hereinafter)). The pressure sensor may be a sensor which can measure a strength of pressure of a user's touch. The pressure sensor may be implemented in an integrated form with the touch panel 252 or as one or more sensors separately from the touch panel 252.

The hologram device 264 may show a three-dimensional image in the air using light interference. The projector 266 may display an image by projecting light onto a screen. The screen may be located, for example, in the interior of, or on the exterior of, the electronic device 201. According to various embodiments, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) interface 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like.

The camera module 291 is, for example, a device which may capture a still image and a video. According to various embodiments, the camera module 291 may include one or more image sensors (for example, a front sensor or a back sensor), a lens, an Image Signal Processor (ISP) or a flash (for example, LED or xenon lamp). That is, the camera module 291 may include a plurality of image sensors having different characteristics. The different characteristics are factors for determining characteristics of captured images and may be characteristics for types of images (black and white or color), resolution, and an angle of view. In order to apply the proposed various embodiments, the camera module 291 may capture a 360-degree image through at least two optical lenses and generate a polyhedron image or a plane image on the basis of image data acquired through capturing.

The power management module 295 may manage, for example, the power of the electronic device 201. According to various embodiments, the power management module 295 may include a Power Management Integrated Circuit (PMIC), a charger Integrated Circuit (IC), or a battery 296 or fuel gauge. The PMIC may use a wired and/or wireless charging method. The wireless charging method may include, for example, a magnetic-resonance method, a magnetic-induction method, an electromagnetic-wave method, and the like. Additional circuits (for example, a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electric signal into mechanical vibration, and may generate vibration, a haptic effect, or the like. Although not illustrated, the electronic device 201 may include a processing device (for example, a GPU) for supporting mobile TV. The processing device for supporting mobile TV may process, for example, media data according to a certain standard such as digital multimedia broadcasting (DMB), digital video broadcasting (DVB), or MediaFlo™.

Each of the above-described component elements of hardware according to the disclosure may be configured with one or more components, and the names of the corresponding component elements may vary based on the type of electronic device. According to various embodiments, the electronic device 201 may include at least one of the aforementioned elements of the disclosure, and some elements may be omitted or additional other elements may be further included. Also, some elements of the electronic device according to various embodiments may be combined into one entity, which may perform functions identical to those of the corresponding elements before the combination.

Figure 3:
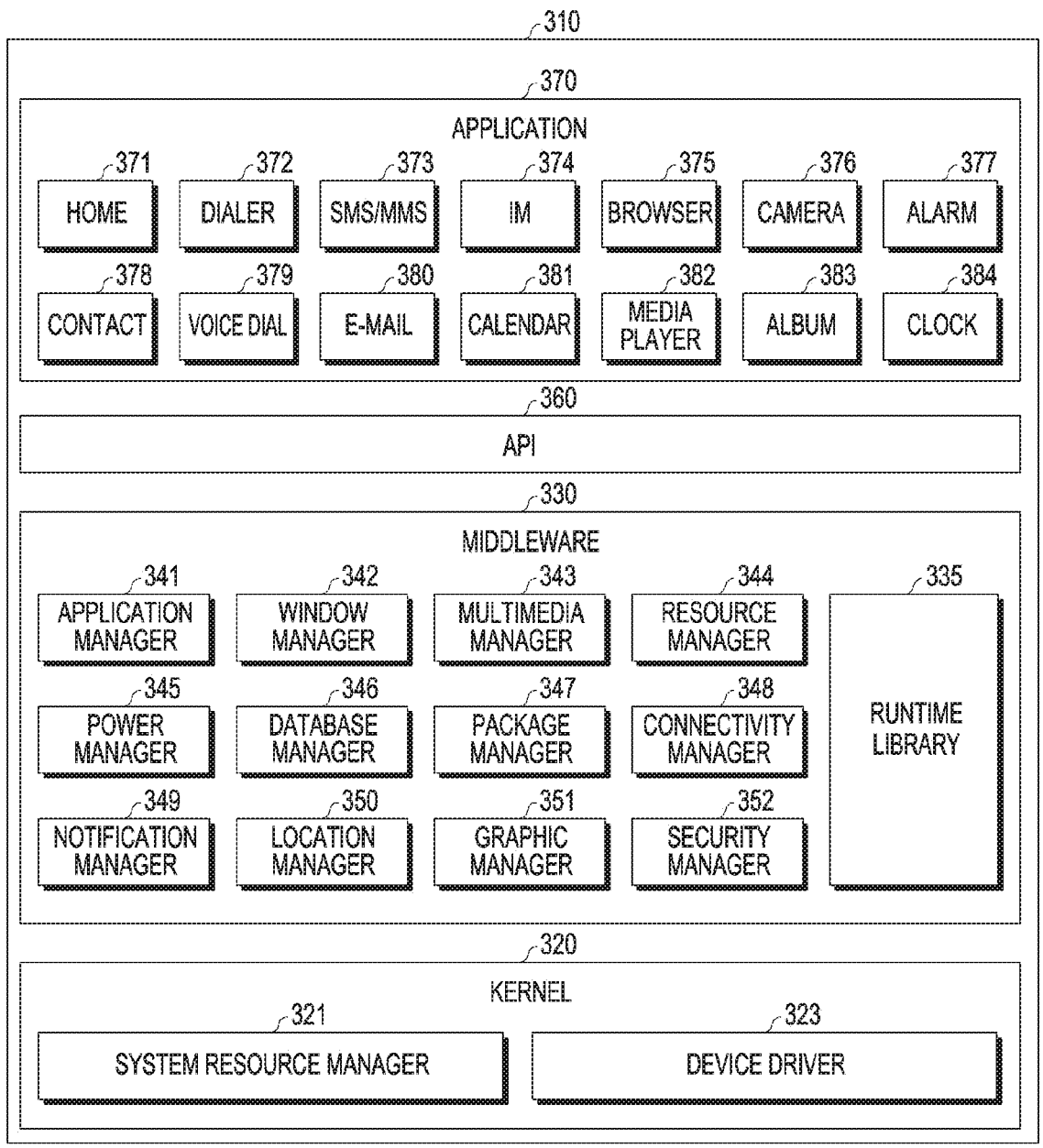
FIG. 3 illustrates the configuration of a program module according to various embodiments of the disclosure.

FIG. 3 illustrates the configuration of a program module according to various embodiments of the disclosure.

Referring to FIG. 3, a program module 310 (for example, the program 180) may include an Operating System (OS) for controlling resources related to the electronic device and/or various applications (for example, the applications 187) executed in the operating system. The operating system may be, for example, Android, iOS, Windows, Symbian, Tizen, Bada, and the like The program module 310 may include a kernel 320, middleware 330, an Application Programming Interface (API) 360, and/or an application 370. At least some of the program module 310 may be preloaded to the electronic device or may be downloaded from an external electronic device (for example, the electronic device 102 or 104 or the server 106).

For example, the kernel 320, the middleware 330, the API 360, and the application 370 included in the program module 310 may correspond to the kernel 181, the middleware 183, the API 185, and the application 187 included in the program 180 of FIG. 1

The kernel 320 may include, for example, a system resource manager 321 and/or a device driver 323. The system resource manager 321 may control, assign, or retrieve system resources. According to various embodiments, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common, or may provide various functions to the applications 370 via the API 360 so that the applications 370 may efficiently use the limited system resources within the electronic device. According to various embodiments, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform functions that are related to the management of input and output, the management of memory, arithmetic functions, and the like.

The application manager 341 may manage, for example, a life cycle of at least one application of the applications 370. The window manager 342 may manage GUI resources used for a screen. The multimedia manager 343 may identify formats required for reproducing various media files and may encode or decode a media file using a codec suitable for the corresponding format. The resource manager 344 may manage resources, such as source code, memory, storage space, and the like, of at least one of the applications 370.

The power manager 345 may operate together with, for example, a Basic Input/Output System (BIOS) to manage a battery or power, and may provide power information required for operating the electronic device. The database manager 346 may generate, search for, or change a database to be used by at least one of the applications 370. The package manager 347 may manage the installation or update of an application that is distributed in the form of a package file.

The connectivity manager 348 may manage a wireless connection such as, for example, Wi-Fi or Bluetooth. The notification manager 349 may display or provide notification of an event, such as an arrival message, an appointment, a proximity notification, or the like, in such a manner as not to disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to various embodiments, when the electronic device has a telephone call function, the middleware 330 may further include a telephony manager for managing a voice or a video call function of the electronic device.

The middleware 330 may include a middleware module including a combination of various functions of the aforementioned elements. The middleware 330 may provide a module specialized for each type of OS in order to provide a differentiated function. Also, the middleware 330 may dynamically delete some existing elements, or may add new elements.

The API 360 is, for example, a set of API programming functions, and may be provided with different configurations according to operating systems. For example, in the case of Android or iOS, one API set may be provided for each platform, and in the case of Tizen, two or more API sets may be provided for each platform.

The applications 370 may include, for example, one or more applications that can perform functions, such as a home application 371, a dialer application 372, an SMS/MMS application 373, an Instant Message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370 may include an application for performing a function, such as a health care application (for example, measuring an exercise quantity or blood sugar) or an environment information providing application (for example, providing atmospheric pressure, humidity, or temperature information).

According to various embodiments, the applications 370 may include an application (hereinafter, referred to as an "information exchange application" for convenience of description) supporting an information exchange between an electronic device (for example, the electronic device 101) and an external electronic device. The information exchange application may include, for example, a notification relay application for transferring predetermined information to an external electronic device or a device management application for managing an external electronic device.

For example, the notification relay application may have a function of transferring notification information generated by other applications of the electronic device 100 (for example, the SMS/MMS application, the e-mail application, the health care application, or the environmental information application) to the external electronic device. Furthermore, the notification relay application, for example, may receive notification information from an external electronic device and may provide the received notification information to a user.

The device management application may manage (for example, install, delete, or update), at least one function of an external electronic device communicating with the electronic device (for example, a function of turning on/off the external electronic device itself (or some components thereof) or a function of controlling the luminance (or a resolution) of the display), applications operating in the external electronic device, or services provided by the external electronic device (for example, a telephone call service and a message service).

According to various embodiments, the applications 370 may include applications (for example, a health care application of a mobile medical appliance) that are designated according to the attributes of an external electronic device. According to various embodiments, the applications 370 may include applications received from an external electronic device. According to various embodiments, the applications 370 may include a preloaded application or a third-party application that may be downloaded from a server. The names of the elements of the program module 310, according to the embodiment illustrated in the drawing, may vary according to the type of operating system.

According to various embodiments, at least a part of the program module 310 may be implemented as software, firmware, hardware, or a combination of two or more thereof. For example, at least some of the program module 310 may be implemented (for example, executed) by the processor (for example, the processor 210). At least some of the program module 310 may include, for example, a module, a program, a routine, sets of instructions, a process, or the like for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the disclosure and to help with understanding the disclosure, and are not intended to limit the scope of the disclosure. Therefore, it should be construed that all modifications and changes or modified and changed forms based on the technical idea of the disclosure fall within the scope of the disclosure.

Hereinafter, the disclosure will be described in detail with reference to the accompanying drawings.

Figure 4:
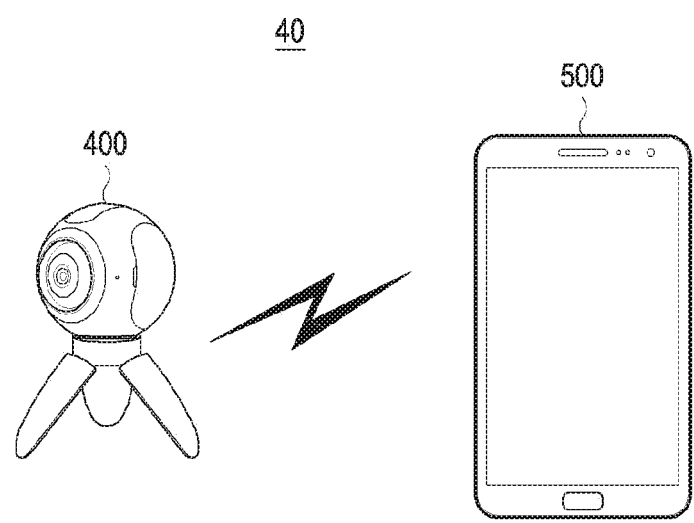
FIG. 4 illustrates an implementation example of an image processing system according to various embodiments of the disclosure.

FIG. 4 illustrates an implementation example of an image processing system according to various embodiments of the disclosure.

An image processing system 40 is a system for transmitting/receiving an omni-directionally captured image, performing rendering, and providing the image to the user.

Referring to FIG. 4, the image processing system 40 includes a first image processing device 400 and a second image processing device 500.

The first image processing device 400 may be a photographing device for taking an omni-directional image or a server for receiving the omni-directional image from the outside and processing the same. Of course, the disclosure is not limited thereto, and the first image processing device 400 may be implemented as the example of the electronic device.

For example, the first image processing device 400 may be a photographing device 400.

The photographing device 400 captures an image omni-directionally. In general, it is not easy to capture an image omni-directionally through a single camera. Accordingly, the photographing device 400 may include a plurality of lenses or a plurality of cameras in order to capture the omni-directional image.

For example, a fisheye lens may have an angle of view wider than or equal to 180 degrees. That is, when the fisheye lens is put to face the sky, it is possible to capture an area from a constellation in the sky to the horizon within one image. The photographing device 400 may include a plurality of fisheye lenses and capture an image omni-directionally. In another example, the photographing device 400 may include a plurality of cameras having a predetermined angle of view and capture an image omni-directionally. In this case, the plurality of cameras may be included in the photographing device 400 to cover the omni-direction based on one point. In another example, the photographing device 400 including one or more cameras may move automatically and/or manually (in a direction of pitch, yaw, and roll) and capture images omni-directionally. In another example, the photographing device 400 may include a plurality of cameras having predetermined angles of view corresponding to left and right eyes of the user. In this case, the photographing device 400 may capture a stereoscopic image including a plurality of omni-directional images by capturing images omni-directionally. Examples of the photographing device 400 are not limited thereto.

Meanwhile, the photographing device 400 may capture not only the omni-direction images but also an image in some directions (for example, a rectangle area corresponding to 120 degrees upwardly, downwardly, leftwardly, and rightwardly based on the lens of the photographing device 400). Further, the photographing device 400 may capture omni-directional images, process the image in some directions among the omni-directional images, and transmit the image to the second image processing device 500.

Meanwhile, the photographing device 400 may perform recording such that the captured images and relevant metadata (for example, photographing direction, range, area, and location) are correlated with each other. In this case, the photographing device 400 may correlate at least one of metadata, that is, the camera location, motion information, and direction information received through a sensor (for example, a GPS sensor, a Wi-Fi fingerprint sensor, a gyro sensor, an acceleration sensor, and a geomagnetic sensor) with at least one of camera characteristic information (for example, camera calibration parameters and photographing state information) and the captured image.

Further, the photographing device 400 may map captured omni-directional images to a two-dimensional plane image, encode the mapped two-dimensional plane image, store the same in the memory or transmit the same to the second image processing device 500.

According to an embodiment, when the omni-directional images are mapped to a polyhedron including triangular sides, the mapped two-dimensional plane image may include an area obtained by arranging the triangular faces of the polyhedron on the two-dimensional plane surface.

According to an embodiment, the omni-directional image may be an image independent from a polyhedron associated with the two-dimensional plane image. For example, the omni-directional image may be an image mapped to the two-dimensional plane image through an Equirectangular Projection (ERP), a cube projection, or a cylindrical projection scheme. According to another embodiment, the omni-directional image may be an image associated with depth information determined through a distance sensor (for example, a Kinect™ camera, lidar, a stereo camera, or a laser distance measurement device).

According to another embodiment, the photographing device 400 may be a virtual camera at a predetermined location in a virtual reality space (for example, a 3D space in a game). In this case, the omni-directional image may be received image information associated with virtual objects within a virtual reality on the basis of characteristics of a virtual camera (for example, location, orientation, angle of view, and range). For example, in a game, an avatar's view may correspond to a Field of View (FoV) of a virtual camera, and an object image area within a virtual reality displayed therethrough may be part of the omni-directional image.

When the mapped two-dimensional image is encoded and transmitted to the second image processing device 500, the photographing device 400 may use a plurality of transmission channels. According to an embodiment, the mapped two-dimensional image may include a plurality of image areas having preset arrangement attributes. In this case, the photographing device 400 may transmit image data of at least one image area among a plurality of image areas through at least one of a plurality of transmission channels mapped to the plurality of image areas, respectively. In this case, the photographing device 400 may also transmit metadata including the preset arrangement attributes.

The photographing device 400 may transmit image data of at least one image area among the plurality of image areas on the basis of viewing angle information. For example, the photographing device 400 may receive viewing angle information of the user from the second image processing device 500, determine at least one image area among the plurality of image areas corresponding to the received viewing angle information, and transmit at least one image area to the second image processing device 500.

In another example, the first image processing device 400 may be a server.

The server may process and transmit the pre-stored omni-directional image or ERP image.

According to an embodiment, the server receives an omni-directional image or an ERP image from an external electronic device (for example, a camera or another server) and stores the same. In this case, the server may map the omni-directional image or the ERP image to a two-dimensional image. According to an embodiment, the server may encode the mapped two-dimensional image and transmit the encoded two-dimensional image to the image processing device 500. In this case, the server may transmit the mapped two-dimensional image through a plurality of transmission channels. Embodiments which are the same as the embodiments of the photographing device 400 may also be applied to the server. An overlapping description of the photographing device 400 will be omitted herein.

The second image processing device 500 receives and renders omni-directional images mapped to the two-dimensional image.

Specifically, the second image processing device 500 may receive a bitstream of the mapped two-dimensional image from the first image processing device 400 and decode the same. The second image processing device 500 performs rendering using the decoded two-dimensional image and displays the rendered frame.

According to an embodiment, the second image processing device 500 may receive all of the omni-directional images mapped to the two-dimensional image (hereinafter, referred to as a mapped two-dimensional image). In this case, the second image processing device 500 may map all the omni-directional images mapped to a two-dimensional space to a virtual three-dimensional space and render an area corresponding to a FoV of the user.

According to another embodiment, the second image processing device 500 may receive only some of the mapped two-dimensional image through at least one transport channel.

For example, the second image processing device 500 may sense the viewing angle of the user and a center location of the viewing angle through a sensor and transmit the viewing angle of the user and the center location of the viewing angle to the first image processing device 500. The second image processing device 500 may receive at least one image area corresponding to the viewing angle of the user and the center location of the viewing angle from the first image processing device 400 through at least one transmission channel. In this case, the second image processing device 500 may render at least one received image area.

The second image processing device 500 may be various types of electronic devices for processing an image, for example, a Virtual Reality (VR) device such as a Head-Mounted Display (HMD), a mobile phone, a PC, a TV, or a tablet PC.

According to the above description, the first image processing device 400 may transmit an image area corresponding to viewing angle information of the user (for example, the viewing angle of the user and the center location of the viewing angle) in the mapped two-dimensional image through a plurality of transmission channels, that is, selectively transmit some of the plurality of image areas included in the mapped two-dimensional image, thereby significantly improving transmission efficiency.

Hereinafter, processes performed by the first image processing device 400 and the second processing device 500 will be described with reference to FIG. 5.

Figure 5:
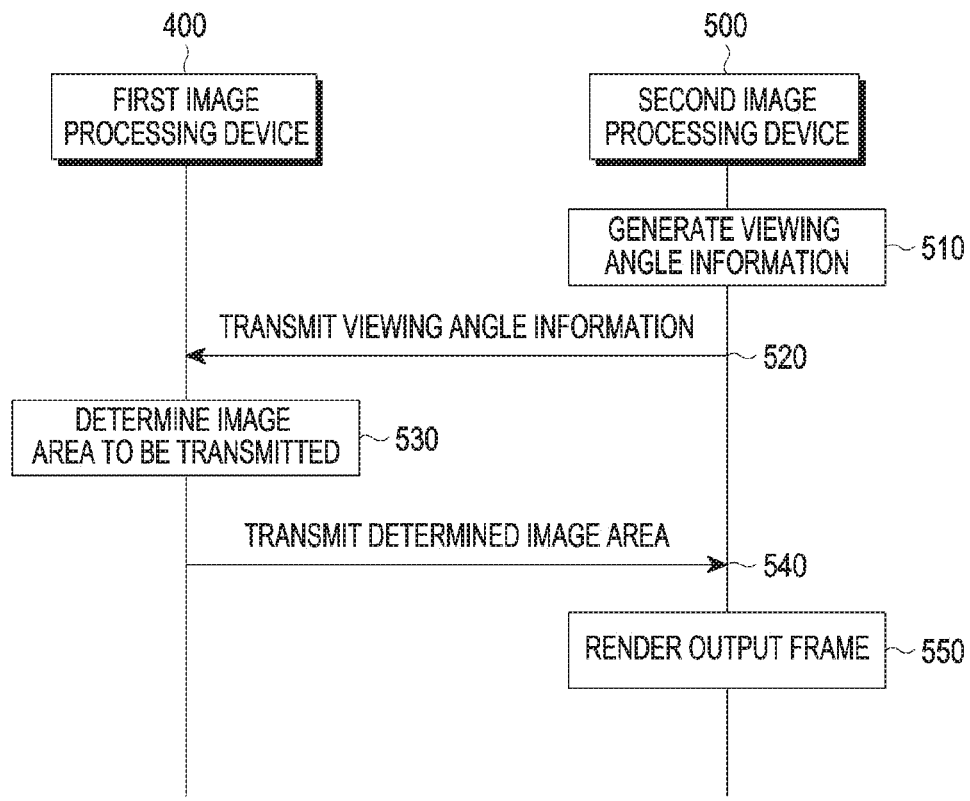
FIG. 5 is a flowchart illustrating a process of processing images by an image processing system according to various embodiments of the disclosure.

FIG. 5 is a flowchart illustrating image processing by the image processing system 40 according to various embodiments of the disclosure.

First, the second image processing device 500 may generate viewing angle information in step 510. For example, the image processing device 500 may sense the size of the viewing angle of the user and central coordinates of the viewing angle to generate viewing angle information including the viewing angle of the user and the center location of the viewing angle. The second image processing device 500 may transmit the generated viewing angle information to the first image processing device 400.

Upon receiving the viewing angle information, the first image processing device 400 determines at least one area transmitted to the second image processing device 500 among a plurality of areas included in the mapped two-dimensional image on the basis of the viewing angle information in step 530. Specifically, the first image processing device 400 may determine an area required for covering a field of view of the user among a plurality of areas included in the mapped two-dimensional image on the basis of the viewing angle information.

In this case, the first image processing device 400 may transmit at least one determined area to the second image processing device 500 in step 540.

When at least one area is received, the second image processing device 500 may render the image area corresponding to the viewing angle information on the basis of at least one received area.

In the above description, the process in which the image processing system 40 processes the image has been described in detail. Hereinafter, detailed elements of the first and second image processing devices 400 and 500 and image processing methods thereof will be described through various embodiments.

Figure 6:
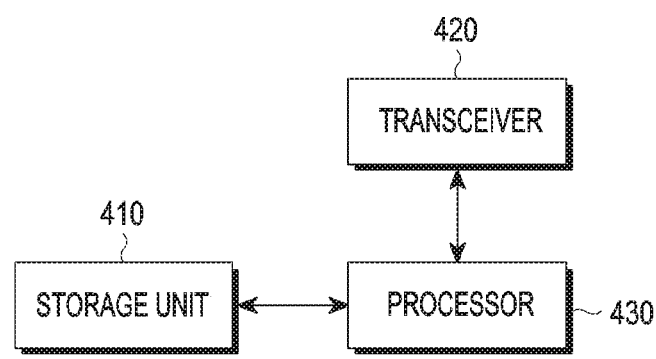
FIG. 6 is a block diagram illustrating a first image processing device according to various embodiments of the disclosure.

FIG. 6 is a block diagram illustrating the first image processing device 400 according to various embodiments of the disclosure.

Referring to FIG. 6, the first image processing device 400 includes a storage unit 410, a transceiver 420, and a processor 430.

The storage unit 410 stores an input frame.

According to an embodiment, the input frame may be a two-dimensional image to which omni-directional images are mapped.

In this case, the omni-directional images may be arranged on the two-dimensional image according to preset arrangement attributes. In other words, the input frame may include a plurality of areas having preset arrangement attributes. The preset arrangement attributes may be attributes for defining an arrangement type of a plurality of image areas in the input frame. The preset arrangement attributes will be described below in detail.

According to an embodiment, the omni-directional images may be mapped to the two-dimensional image after passing through a process in which the omni-directional images are mapped to respective faces of a polyhedron. In this case, the plurality of image areas may be image areas in which images of respective faces of a three-dimensional polyhedron are mapped to the two-dimensional image.

In the above example, the case in which the two-dimensional image to which three-dimensional images are mapped is pre-stored in the storage unit 410 has been described, but the disclosure is not limited thereto. According to an embodiment, the processor 130 described below may receive omni-directional images captured by a camera including a lens capable of capturing all directions such as a fisheye lens or a plurality of cameras capable of capturing all directions, map the received omni-directional images to the two-directional image, and store the two-dimensional image in the storage unit 410. According to another embodiment, the processor 130 described below may receive an image passing through the ERP from an external electronic device, map the image to a polyhedron, map the image mapped to the polyhedron to the two-dimensional image, and store the two-dimensional image in the storage unit 410. Alternatively, the processor 430 may receive an image passing through the ERP from an external electronic device, directly map the image to the two-dimensional image, and store the two-dimensional image in the storage unit 410. A method of receiving the preset arrangement attributes and the three-dimensional image in various forms and mapping the three-dimensional image to the two-dimensional image will be described in detail with reference to the operation of the processor 430 described below.

Further, the storage unit 410 may store metadata including preset arrangement attributes. In this case, the processor 430 may control the transceiver 420 to transmit the metadata. Alternatively, the processor 430 may generate metadata including the preset arrangement attributes and control the transceiver 420 to transmit the metadata or store the metadata in the storage unit 410.

The transceiver 420 receives viewing angle information. For example, the viewing angle information may be provided from the second image processing device 500. The viewing angle information will be described in detail with reference to the operation of the second image processing device 500 described below.

The processor 430 may map omni-direction images to a two-dimensional image. Hereinafter, an embodiment of a method of mapping omni-directional images to a two-dimensional image will be described in detail with reference to FIGS. 7A to 7C.

Various methods of mapping an image obtained by capturing a three-dimensional space to a two-dimensional image have been already known. Among them, a representative method is Equirectangular Projection (ERP). The ERP corresponds to equidistant cylindrical projection for converting spherical coordinates into Cartesian coordinates. However, when a three-dimensional sphere surface is mapped to a two-dimensional plane through the ERP, larger distortion may occur as the image is closer to both poles (North pole and South pole) on the two-dimensional plane. Accordingly, the ERP has a limitation on accurately expressing an original three-dimensional image.

According to various embodiments of the disclosure, the first image processing device 400 may map images captured in all directions (hereinafter, referred to as omni-directional images) to a polyhedron and map images mapped to respective faces of the polyhedron to a two-dimensional image. According to various embodiments, the first image processing device 400 may map the omni-directional images to the surface of a first three-dimensional object and map the images mapped to the surface of the first three-dimensional object to the surface of a second three-dimensional object through calculations for converting the first three-dimensional object into the second three-dimensional object. Thereafter, the first image processing device 400 may map the images mapped to the surface of the second three-dimensional object to the two-dimensional plane. For example, the first image processing device 400 may map the image captured in all directions to a three-dimensional sphere having a predetermined radius (for example, camera focal length or depth information) and map the three-dimensional sphere to each face of a regular octahedron. Thereafter, the first image processing device 400 may map each face of the regular octahedron to the two-dimensional image. The method includes, for example, an Octahedron Projection (OHP) method.

In the aforementioned example, the process of mapping the image captured in the omni direction to the sphere and then mapping the sphere to the two-dimensional image has been described, but it is not limited thereto. For example, the two-dimensional image may be generated by directly applying the OHP method to a fisheye image, an ERP image, a CPP image, or an image mapped to various types of polyhedrons (for example, a tetrahedron, a dodecahedron, or an icosahedron). Further, the image mapped to the sphere or the two-dimensional image does not necessarily need to be an image captured through a camera. For example, a virtual image may be mapped to the sphere or the two-dimensional image.

The OHP method according to various embodiments of the disclosure is a method of mapping a three-dimensional spherical surface to a two-dimensional plane using an octahedron platonic solid. Hereinafter, various embodiments of mapping using a regular octahedron will be described, but the disclosure is not limited thereto. According to an embodiment, a three-dimensional spherical surface may be mapped to a two-dimensional plane using a regular tetrahedron, a regular hexahedron, a regular dodecahedron, and a regular icosahedron. According to another embodiment, of course, a three-dimensional spherical surface can be mapped to a two-dimensional plane using a polyhedron having a plurality of different face shapes.

Figure 7A:
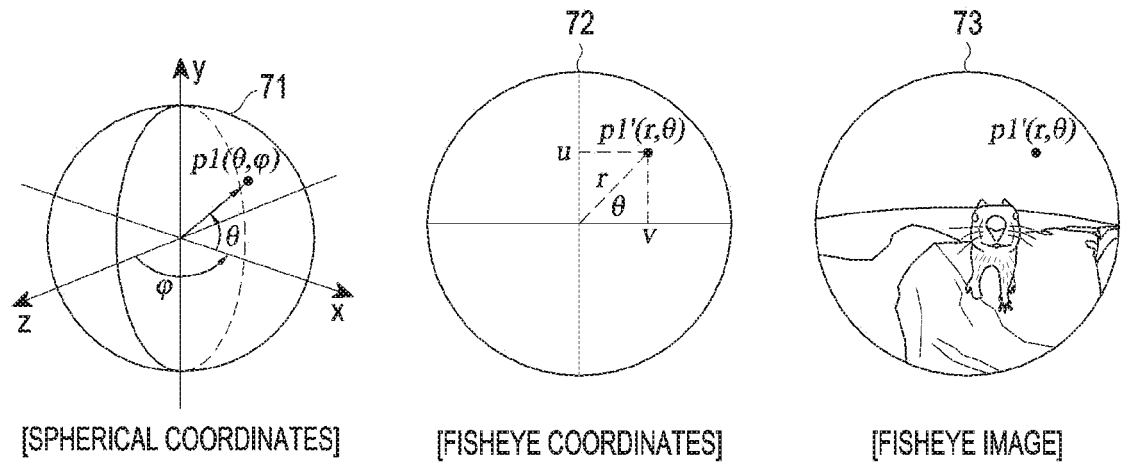
FIG. 7A illustrates an OHP method according to various embodiments of the disclosure.
Figure 7B:
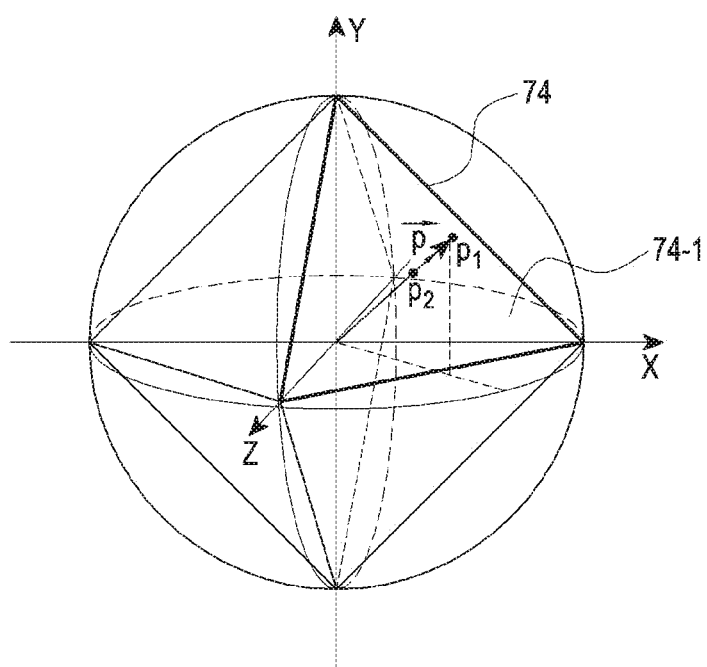
FIG. 7B illustrates an OHP method according to various embodiments of the disclosure.
Figure 7C:
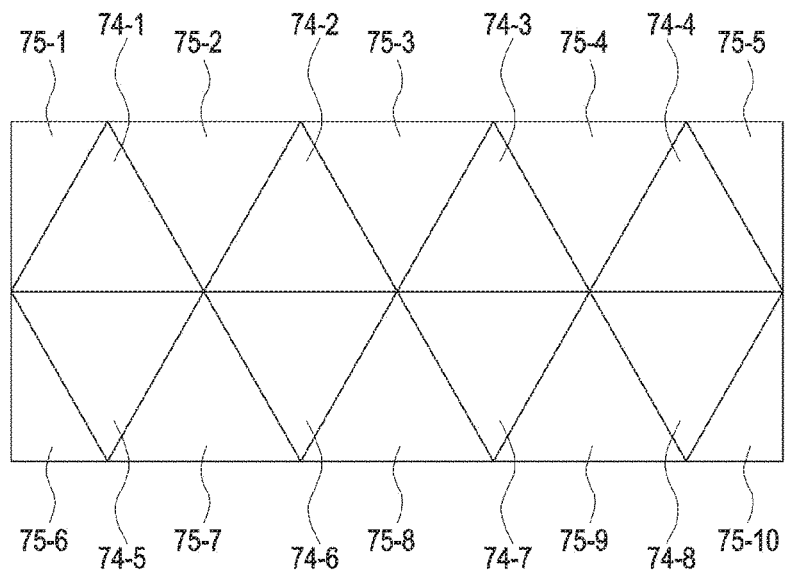
FIG. 7C illustrates an OHP method according to various embodiments of the disclosure.

FIG. 7A illustrates an OHP method according to various embodiments of the disclosure; FIG. 7B illustrates an OHP method according to various embodiments of the disclosure; FIG. 7C illustrates an OHP method according to various embodiments of the disclosure;

FIG. 7A illustrates a process of converting spherical coordinates 71 into coordinates (hereinafter, referred to as "fisheye coordinates") 72 of an image 73 captured through a fisheye lens.

An example is described based on the assumption that a point of fisheye coordinates 72 of the fisheye image 73 corresponding to a point $p1(\Phi, \theta)$ of the spherical coordinates is $p1'(r, \theta)$. The relationship between $\Phi$, $\theta$ of the spherical coordinates 71 and r, u, v of the fisheye coordinates 72 is as shown in [Equation 1] below.

$$r=\varphi/(\pi/2),\ u=\tfrac{1}{2}(1+\cos\theta),\ v=\tfrac{1}{2}(1+\sin\theta) \quad \text{[Equation 1]}$$

In [Equation 1] above, the point $p1'(r, \theta)$ of the fisheye image 73 corresponds to the point $p1(\Phi, \theta)$ of the spherical coordinates 71. Not only the point $p1'(r, \theta)$ but also all points included in the fisheye image 72 may correspond to the spherical coordinates 71. In this case, the aforementioned point may be, for example, a pixel. Accordingly, pixel values of all pixels included in the fisheye image 73 may match the spherical coordinates 71.

Subsequently, the first image processing device 400 may convert points of the spherical coordinates 71 into coordinates included in the face of the regular octahedron.

FIG. 7B illustrates an example of a method of corresponding a point p1 of the spherical coordinates 71 to a point p2 included in a face 74-1 of a regular octahedron 74.

For example, it is assumed that a vector from the center of the spherical coordinates 71 to the point p1 is a vector $\vec{p}$.

On the vector $\vec{p}$, the point p1 and the point p2 exist. That is, the point p2 is an intersection point between the vector $\vec{p}$ and the face of the regular octahedron.

As a result, a point p1' of the fisheye image 73 matches the point p2 on the face 74-1 of the regular octahedron 74. For example, a pixel value of a pixel corresponding to the point p1' of the fisheye image may be set as a pixel value of a pixel corresponding to the point p2 on the face 74-1 of the regular octahedron 74.

Subsequently, the faces of the regular octahedron 74 may be mapped to a two-dimensional plane 75.

For example, as illustrated in FIG. 7C, the respective faces of the regular octahedron 74 may be mapped to first areas 74-1 to 74-8 of the two-dimensional image 75. Second areas 75-1 to 75-10 are areas to which no face of the regular octahedron 74 is mapped.

The second areas 75-1 to 75-10 correspond to a "no data" area to which no face of the regular octahedron 74 is mapped and include no image data. Accordingly, the two-dimensional image 75 to which the fisheye image 73 from which lens distortion is corrected is mapped has actual image data capacity which is significantly smaller than that of the two-dimensional image obtained by mapping the fisheye image 73 to a three-dimensional sphere according to the OHP method and then mapping the spherical image according to the ERP method. Therefore, when the two-dimensional image 75 to which the fisheye image 73 is mapped is encoded according to the OHP, it is possible to obtain larger compression efficiency compared to the case using the ERP.

Meanwhile, there are various methods of mapping the faces of the regular octahedron 74 to which the spherical coordinates 71 are mapped to the two-dimensional image. Such examples will be described with reference to FIGS. 8A to 8H. The method of mapping the regular octahedron 74 to the two-dimensional image is not limited to the following methods.

Figure 8A:
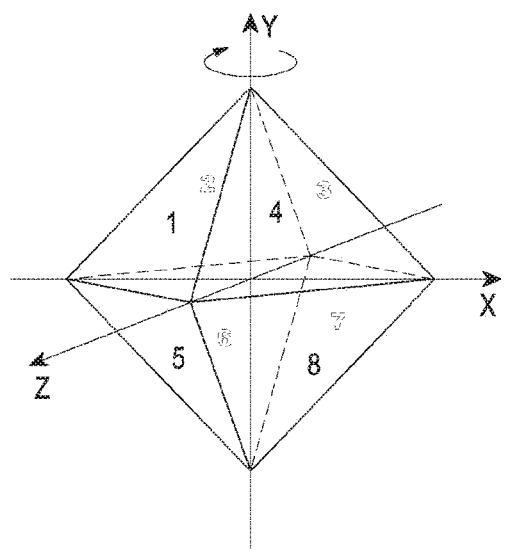
FIG. 8A illustrates the OHP method according to various embodiments of the disclosure.
Figure 8B:
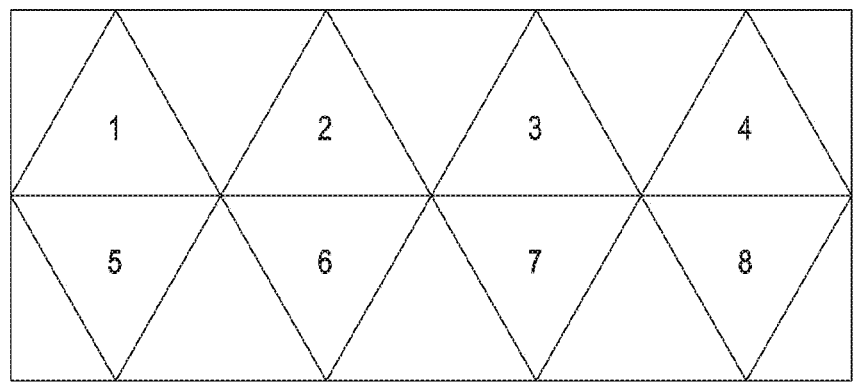
FIG. 8B illustrates the OHP method according to various embodiments of the disclosure.
Figure 8C:
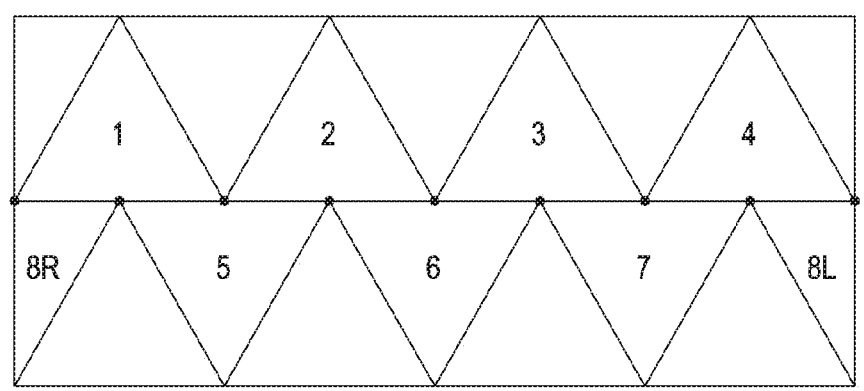
FIG. 8C illustrates the OHP method according to various embodiments of the disclosure.
Figure 8D:
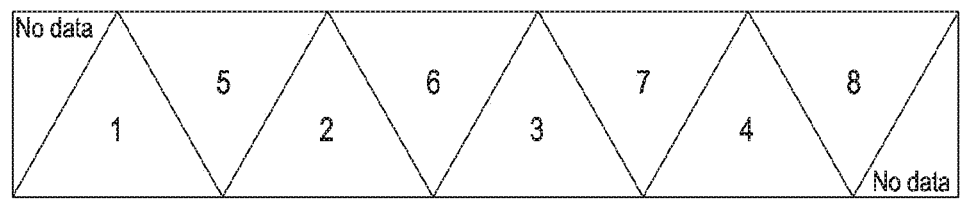
FIG. 8D illustrates the OHP method according to various embodiments of the disclosure.
Figure 8E:
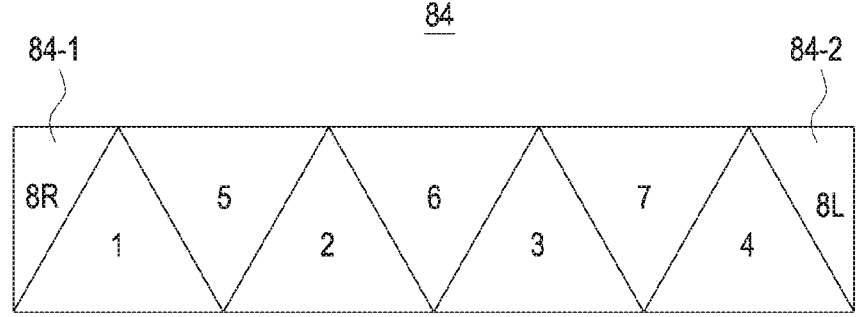
FIG. 8E illustrates the OHP method according to various embodiments of the disclosure.
Figure 8F:
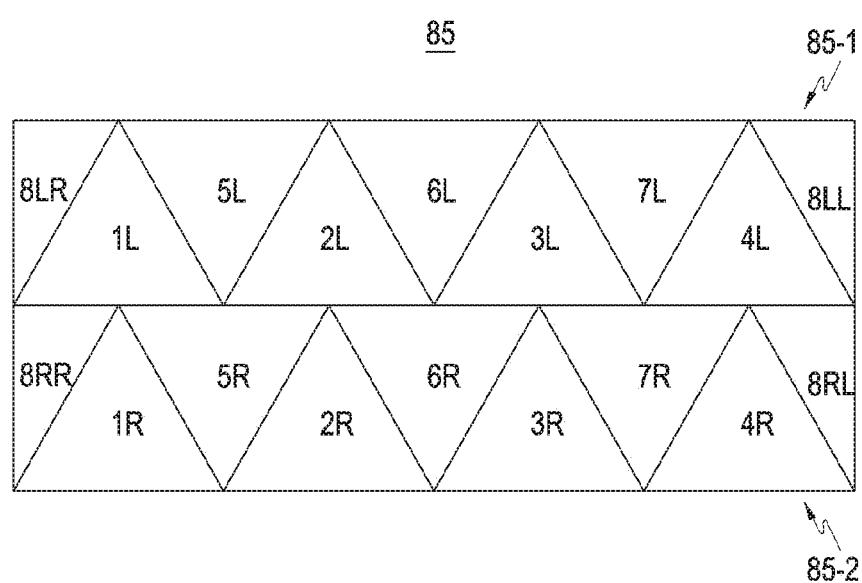
FIG. 8F illustrates the OHP method according to various embodiments of the disclosure.
Figures 8G, 9:
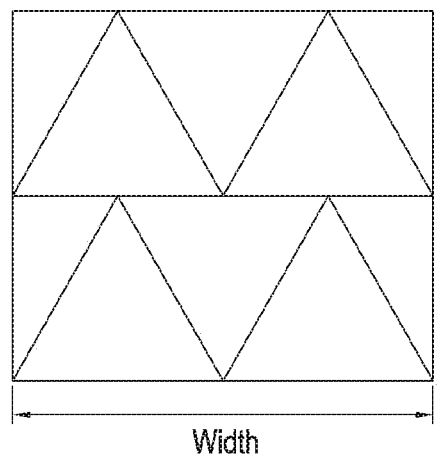
FIG. 8G illustrates the OHP method according to various embodiments of the disclosure.
FIG. 9 illustrates matching information of a plurality of transmission channels according to various embodiments of the disclosure.

FIG. 8A illustrates the OHP method according to various embodiments of the disclosure; FIG. 8B illustrates the OHP method according to various embodiments of the disclosure; FIG. 8C illustrates the OHP method according to various embodiments of the disclosure; FIG. 8D illustrates the OHP method according to various embodiments of the disclosure; FIG. 8E illustrates the OHP method according to various embodiments of the disclosure; FIG. 8F illustrates the OHP method according to various embodiments of the disclosure; and FIG. 8G illustrates the OHP method according to various embodiments of the disclosure.

Referring to FIG. 8A, a regular octahedron 80 includes 8 faces numbered from 1 to 8. Face 1 to face 4 of the regular octahedron 80 are defined as upper faces and face 5 to face 8 are defined as lower faces. In this case, the number of upper faces and the number of lower faces are the same as each other, which is ½ of all faces. Further, each side of triangles on the plane having X and Z axes has a bearing of 360/(N/2)(N is the number of faces of a polyhedron) based on a Y axis of the polyhedron. For example, each face of the regular octahedron 80 splits the omni direction, that is, 360 degrees surrounding the y axis by 90 degrees based on the Y axis in the upper part and the lower part. In another example, in the case of a hexadecahedron having 8 upper faces and 8 lower faces, each face of which is an isosceles triangle, each face of the hexadecahedron splits the omni direction, that is, 360 degrees surrounding the Y axis by 45 degrees based on the Y axis. Hereinafter, a method of arranging the respective faces (face 1 to face 8) of the regular octahedron 80 of FIG. 8A in a two-dimensional image will be described with reference to FIGS. 8B to 8H.

Referring to FIG. 8B, upper faces of the regular octahedron 80, that is, face 1 to face 4 are arranged from the left to the right on the upper part of the two-dimensional image 81 in a clockwise direction. Further, lower faces of the regular octahedron 80, that is, face 5 to face 8 are arranged from the left to the right on the lower part of the two-dimensional image 81 in a clockwise direction.

Referring to FIG. 8C, the upper faces of the regular octahedron 80, that is face 1 to face 4 are arranged from the left to the right on the upper part of the two-dimensional image 82. In a state where lower faces of the regular octahedron 80 rotate by 45 degrees in a counterclockwise direction from the Y axis of the regular octahedron 80, face 5 to face 8 of the lower faces are arranged from the left to the right on the lower part of the two-dimensional image 82 in a clockwise direction. In FIG. 8C, face 8L is a left face of face 8 and face 8R is a right face of side 8.

Meanwhile, the faces of the regular octahedron 80 may be arranged according to an array method of minimizing an area ("no data" area) to which no image is mapped in the two-dimensional image 82. In this case, since the size of the two-dimensional image can be reduced by removing the "no data" area, encoding efficiency and image transmission efficiency can be increased. In other words, the "no data" area has no image mapped thereto but has a predetermined pixel value (for example, one or more of a black, a chroma-key color, and transparency), and capacity of data to be encoded or transmitted may be further reduced as the "no data" area is further minimized. According to an embodiment, as illustrated in FIG. 8D, the upper faces (face 1 to face 4) and the lower faces (face 5 to face 8) of the regular octahedron 80 may be alternately arranged on the two-dimensional image 83.

Referring to FIG. 8E, there may be a method of splitting face 8 of the regular octahedron 80 into face 8L (left) and face 8R (right) and mapping face 8L and face 8R to areas 84-1 and 84-2 of the two-dimensional image 84.

FIG. 8F illustrates a method of mapping a left eye image of the three-dimensional image to a two-dimensional image. Referring to FIG. 8F, a left eye image is mapped to an upper part 85-1 of a two-dimensional image 85 and a right eye image is mapped to a lower part 85-2 of the two-dimensional image 85. Referring to FIG. 8F, with respect to face 1, face 1L is an image corresponding to a left eye and face 1R is an image corresponding to a right eye, and 8LL indicates a left half face of the rectangle corresponding to the left eye and 8RL indicates a left half face of the rectangle corresponding to the right eye. FIG. 8F is a stereoscopic image in which a left eye image and a right eye image are arranged in a top-down type, which is used as metadata for generating the two-dimensional image 85. In this case, the image illustrated in FIG. 8F may be identified by one or more identifiers indicating that arrangement of the left eye and the right eye is a top-down type (for example, stereoscopic=true, stereoscopic_type=top–down).

According to various embodiments, it is possible to use a method of mapping upper faces of a left eye image and a right eye image of a stereoscopic shape corresponding to a shape of the regular octahedron 80 to the upper part of the two-dimensional image and mapping lower faces to the lower part of the two-dimensional image (not shown). That is, triangles of each of the left eye and right eye images corresponding to face 1 to face 4 of the regular octahedron 80 may be arranged on the upper part and triangles of each of the left eye and right eye images corresponding to face 5 to face 8 may be arranged on the lower part (hereinafter, referred to as a mixed type). This has an effect of making triangles including similar images close to each other, thereby improving encoding compression efficiency and transmission efficiency. Meanwhile, a method of reducing, when a three-dimensional image is mapped to a two-dimensional image, a width (a horizontal resolution and the number of pixels on a row) of the two-dimensional image may be also considered. Since every electronic device has a limitation on a width of a two-dimensional image used for rendering, the two-dimensional image can be rendered in more various electronic devices as the two-dimensional image has a smaller width.

For example, referring to FIG. 8G, a two-dimensional image 86 includes the same amount of image data as the two-dimensional image of FIG. 8E, but the width of the two-dimensional image 86 is just half that of the two-dimensional image of FIG. 8E. A method of controlling the width of the mapped two-dimensional image can be equally applied to a method of mapping a stereoscopic image including left eye and right eye images to a two-dimensional image.

Figure 14:
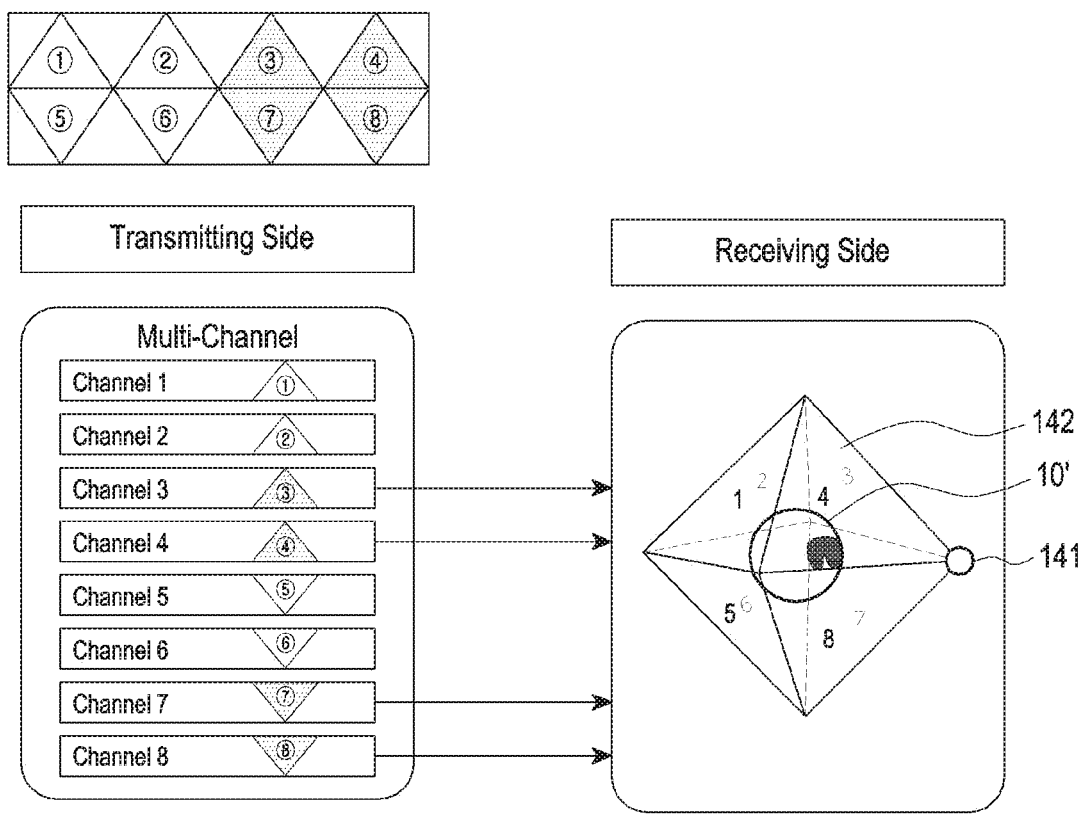
FIG. 14 illustrates a method of selecting image areas corresponding to viewing angle information according to various embodiments of the disclosure.

According to various embodiments, after each of the left eye image and the right eye image is generated in the form of the two-dimensional image 86 of FIG. 14, one two-dimensional image on which the images are successively arranged from the left to the right may be generated. Metadata indicating such a structure may include indicators indicating whether the image is a stereoscopic image and indicating arrangements of the left eye and the right eye (for example, stereoscopic=true, stereoscopic_type=side-by-side or left-right). According to various embodiments, one two-dimensional image on which the left eye image and the right eye image are arranged in a top-down form may be generated.

The various embodiments for mapping the omni-directional image to the two-dimensional image using the polyhedron (for example, the regular octahedron) have been described above. As described above, the two-dimensional image to which the omni-directional images are mapped may be pre-stored in the storage unit 410 or the omni-directional images (for example, fisheye images or ERP images) may be mapped to the two-dimensional image and stored in the storage unit 410 by the processor 430.

Meanwhile, the processor 430 may transmit at least one the plurality of image areas included in the input frame (for example, the two-dimensional image to which the omni-directional images are mapped). In this case, the processor 430 may transmit the plurality of image areas through one transmission channel. However, this is not limiting. According to an embodiment, the processor 430 may use at least one of a plurality of transmission channels mapped to the plurality of image areas, respectively.

Here, a mapping relation between the plurality of image areas and the plurality of transmission channels may be preset and pre-stored in the storage unit 410. Alternatively, a table for the mapping relation between the plurality of image areas and the plurality of transmission channels may be provided from an external electronic device.

For example, a table 90 of FIG. 9 includes matching information between the plurality of image areas and the plurality of transmission channels. Referring to FIG. 9, among the plurality of image areas, image area 1 may match ch.1, image area 2 may match ch.2, image area 3 may match ch.3, image area 4 may match ch.4, image area 5 may match ch.5, image area 6 may match ch.6, image area 7 may match ch.7, and image area 8 may match ch.8.

Hereinafter, an example of allocating two-dimensional image areas included in the input frame to a plurality of transmission channels on the basis of a preset matching relation between a plurality of image areas and a plurality of transmission channels will be described with reference to FIGS. 10 to 12.

Figure 10:
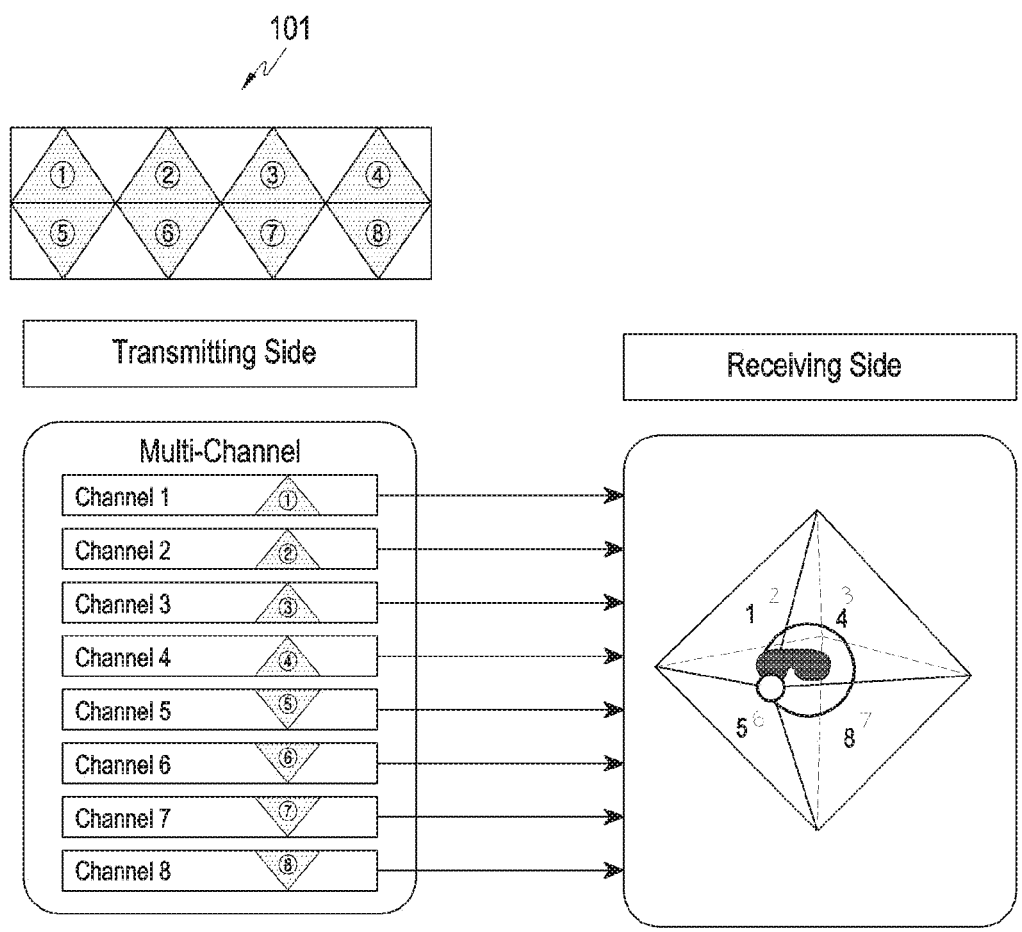
FIG. 10 illustrates a method of transmitting a plurality of image areas through a plurality of transmission channels according to various embodiments of the disclosure.

FIG. 10 illustrates a method of transmitting a plurality of image areas through a plurality of transmission channels according to various embodiments of the disclosure.

Referring to FIG. 10, an input frame 101 includes a plurality of image areas (image areas 1 to 10). It is assumed that the plurality of image areas match a plurality of transmission channels (channel 1 to channel 10), respectively. According to an embodiment, the first image processing device 400 at the transmitting end may carry image area 1 on channel 1, image area 2 on channel 2, image area 3 on channel 3, image area 4 on channel 4, image area 5 on channel 5, image area 6 on channel 6, image area 7 on channel 7, image area 8 on channel 8, image area 9 on channel 9, and image area 10 on channel 10 to transmit the image areas to the second image processing device 500 of the receiving end.

Meanwhile, an input frame having an arrangement different from an arrangement of the plurality of image areas included in an input frame 101 of FIG. 10 may be transmitted to the receiving end.

Figure 11:
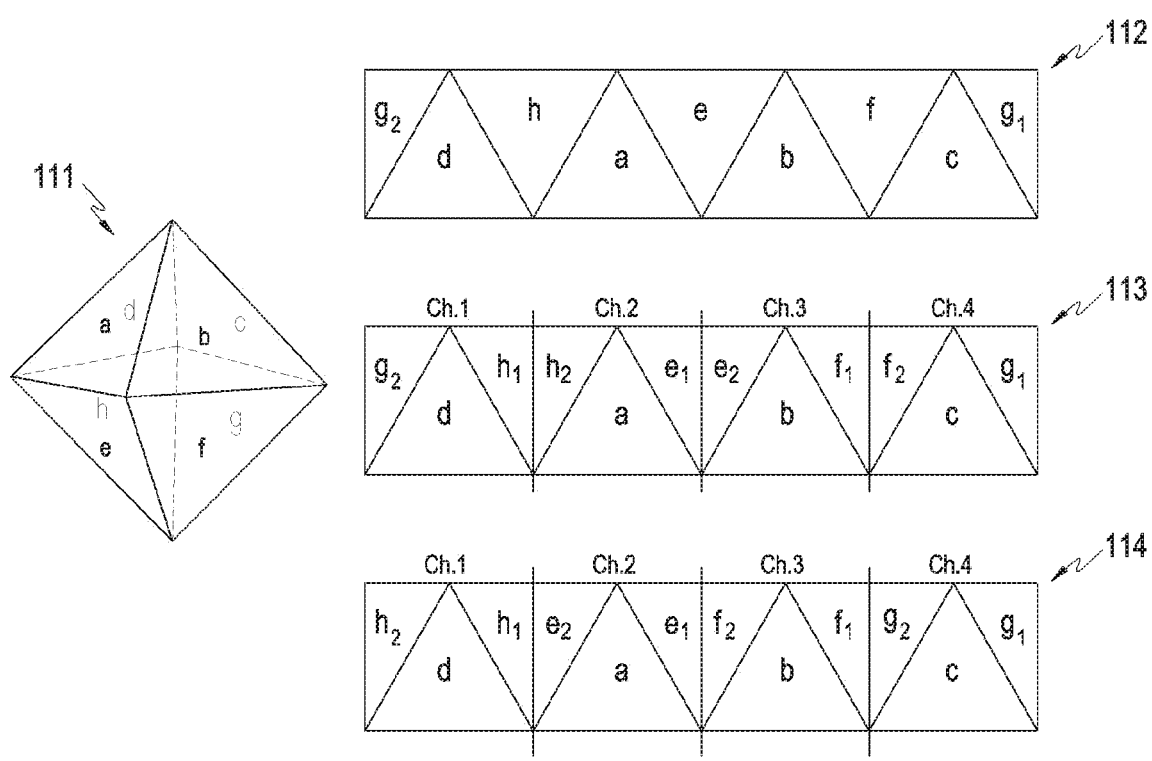
FIG. 11 illustrates a method of matching a plurality of image areas and a plurality of transmission channels according to various embodiments of the disclosure.

FIG. 11 illustrates a method of matching a plurality of image areas and a plurality of transmission channels according to various embodiments of the disclosure; FIG. 12 illustrates a method of matching a plurality of image areas and a plurality of transmission channels according to various embodiments of the disclosure Referring to FIG. 11, an input frame 112 may be a two-dimensional image to which images of respective faces of a regular octahedron 111 are mapped.

According to an embodiment, a plurality of image areas (a to f, g1, and g2) included in the input frame 112 may be allocated to a plurality of transmission channels (ch.1 to ch.4) as indicated by reference numeral 113. Specifically, image area h included in the input frame 112 may be divided into h1 and h2, image area e may be divided into e1 and e2, and image area f may be divided into f1 and f2, and image areas g2, d, and h1 may be allocated to ch.1, image areas h2, a, and e1 may be allocated to channel ch.2, image areas e2, b, and f1 may be allocated to ch.3, and image areas f2, c, and g1 may be allocated to ch.4.

According to another embodiment, the plurality of image areas (a to f, g1, and g2) included in the input frame 112 may correspond to the plurality of transmission channels (ch.1 to ch.4) as indicated by reference numeral 114. Specifically, image area h included in the input frame 112 may be divided into h1 and h2, image area e may be divided into e1 and e2, and image area f may be divided into f1 and f2, and image areas h1, h2, and d may be allocated to ch.1, image areas e1, e2, and a may be allocated to channel ch.2, image areas f1, f2, and b may be allocated to ch.3, and image areas g1, g2, and c may be allocated to ch.4.

Figure 12:
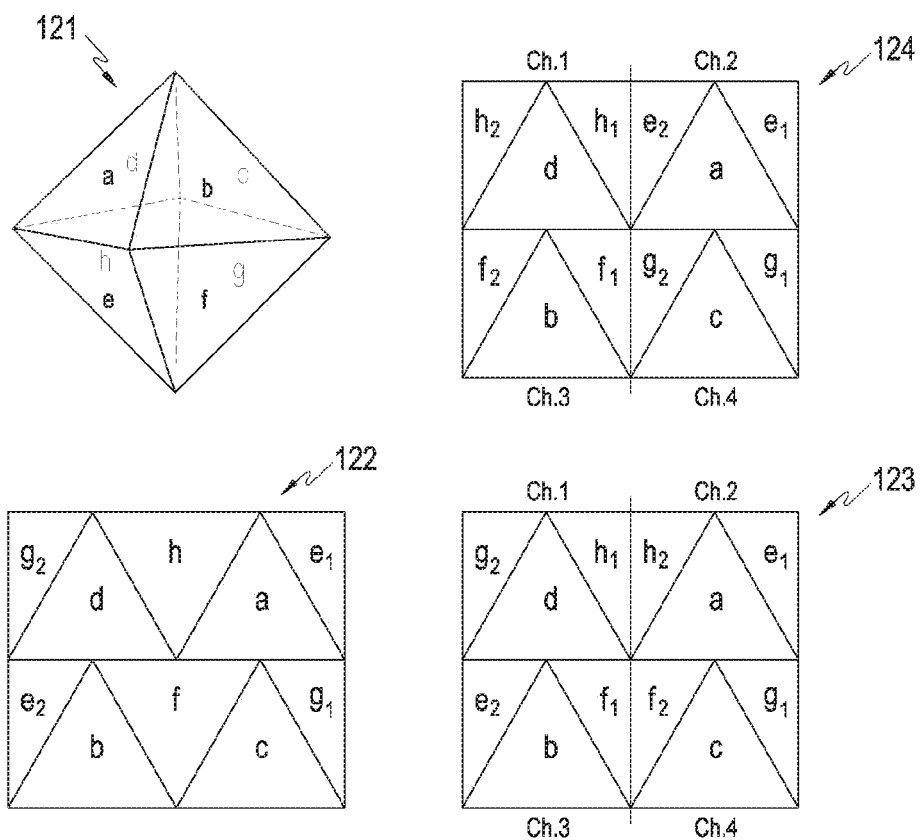
FIG. 12 illustrates a method of matching a plurality of image areas and a plurality of transmission channels according to various embodiments of the disclosure.

Referring to FIG. 12, an input frame 122 may be a two-dimensional image to which respective faces of a regular octahedron 121 are mapped. A width of the input frame 122 is only half the two-dimensional image of FIG. 8E as illustrated in FIG. 8G.

According to an embodiment, the plurality of image areas (a to d, e1, e2, f, g1, g2, and h) included in the input frame 122 may be allocated to the plurality of transmission channels (ch.1 to ch.4) as indicated by reference numeral 123. Specifically, image area f included in the input frame 122 may be divided into f1 and f2 and image area h may be divided into h1 and h2, and image areas g2, d, and h1 may be allocated to ch.1, image areas h2, a, and e1 may be allocated to channel ch.2, image areas e2, b, and f1 may be allocated to ch.3, and image areas f2, c, and g1 may be allocated to ch.4.

According to an embodiment, the plurality of image areas (a to d, e1, e2, f, g1, g2, and h) included in the input frame 122 may be allocated to the plurality of transmission channels (ch.1 to ch.4) as indicated by reference numeral 124. Specifically, image area f included in the input frame 122 may be divided into f1 and f2 and image area h may be divided into h1 and h2, and image areas h1, h2, and d may be allocated to ch.1, image areas e1, e2, and a may be allocated to channel ch.2, image areas f1, f2, and b may be allocated to ch.3, and image areas g1, g2, and c may be allocated to ch.4.

As described above, the processor 430 may transmit the plurality of image areas through separate channels, respectively, on the basis of matching information between the plurality of image areas and the plurality of transmission channels (for example, see FIG. 10). However, this is not limiting. According to an embodiment, the processor 430 may select and transmit an area required to be transmitted from among the plurality of image areas. The processor 430 may use viewing angle information of the user in order to select the area required to be transmitted.

Specifically, the processor 430 may determine at least one image area corresponding to the viewing angle information among the plurality of image areas included in the input frame (for example, the two-dimensional image to which omni-directional images are mapped). For example, the viewing angle information may be received from the second image processing device 500. Further, the processor 430 may control the transceiver 420 to transmit image data of at least one image area corresponding to viewing angle information among the plurality of image areas.

According to an embodiment, the viewing angle information may include information on the size of the viewing angle of the user and information on the center location of the viewing angle of the user. For example, the size of the viewing angle may be 30 degrees and the center location of the viewing angle may be (a1, b1, c1) corresponding to Cartesian coordinates. In another example, the information on the size of the viewing angle may include information on subdivided horizontal and vertical sizes of the viewing angle. For example, the horizontal size of the viewing angle may be 30 degrees, the vertical size of the viewing angle may be 30 degrees, and the center location of the viewing angle may be (a1, b1, c1).

Figure 13:
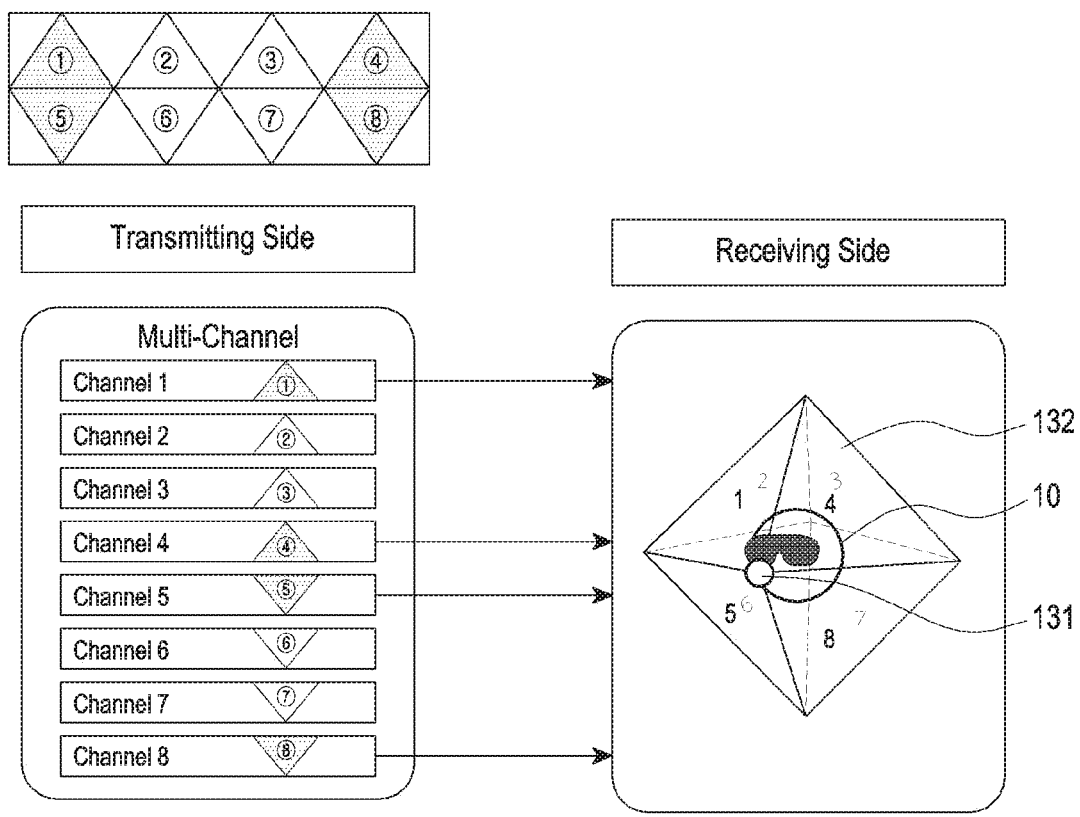
FIG. 13 illustrates a method of selecting image areas corresponding to viewing angle information according to various embodiments of the disclosure.
Figure 15:
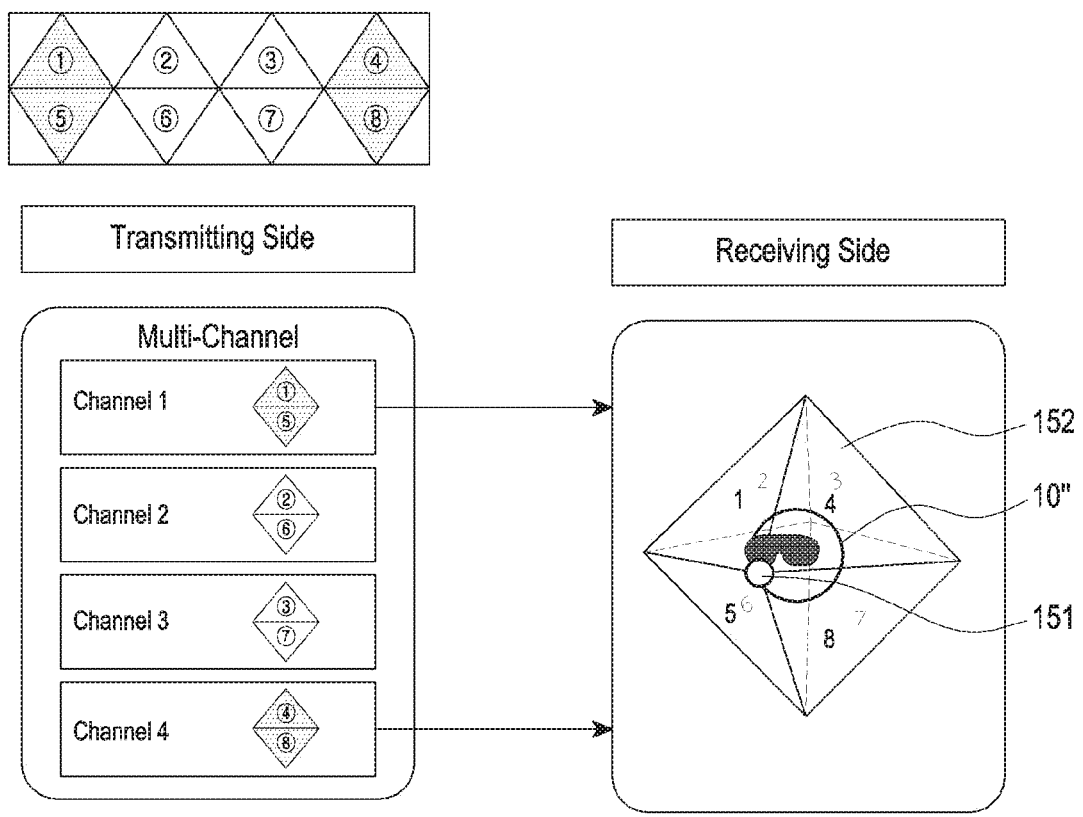
FIG. 15 illustrates a method of selecting image areas corresponding to viewing angle information according to various embodiments of the disclosure.
Figure 16:
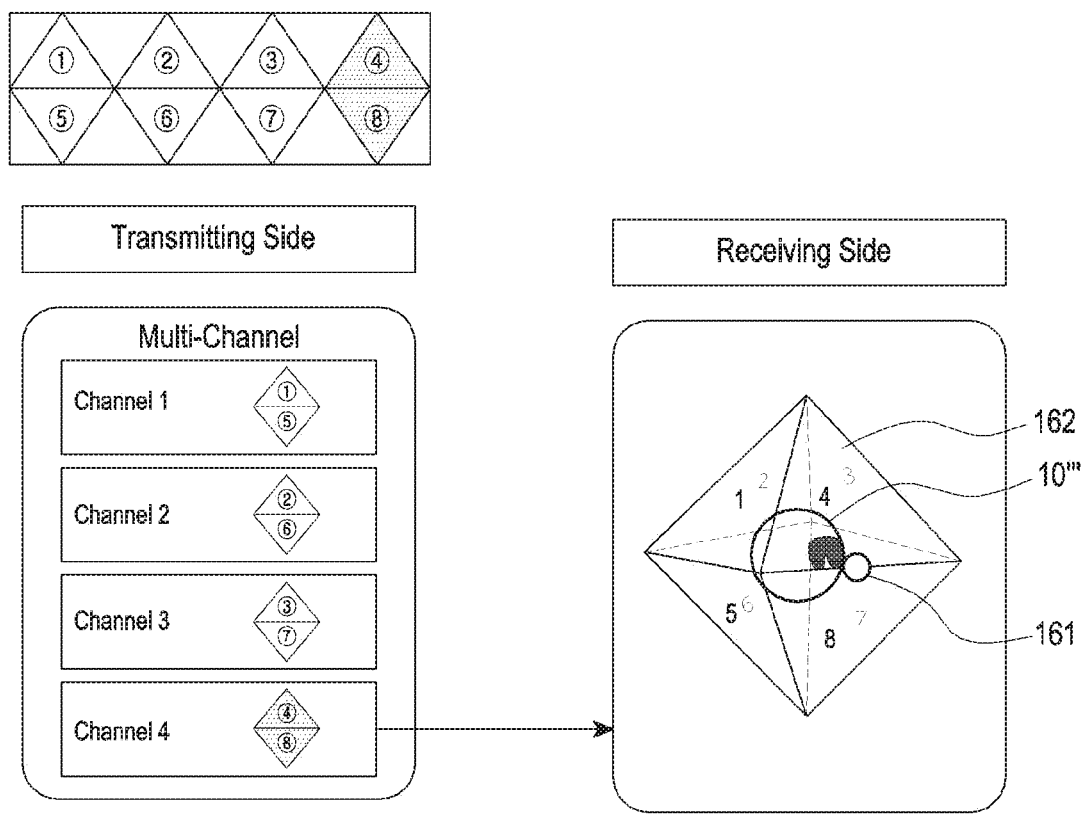
FIG. 16 illustrates a method of selecting image areas corresponding to viewing angle information according to various embodiments of the disclosure.
Figure 17:
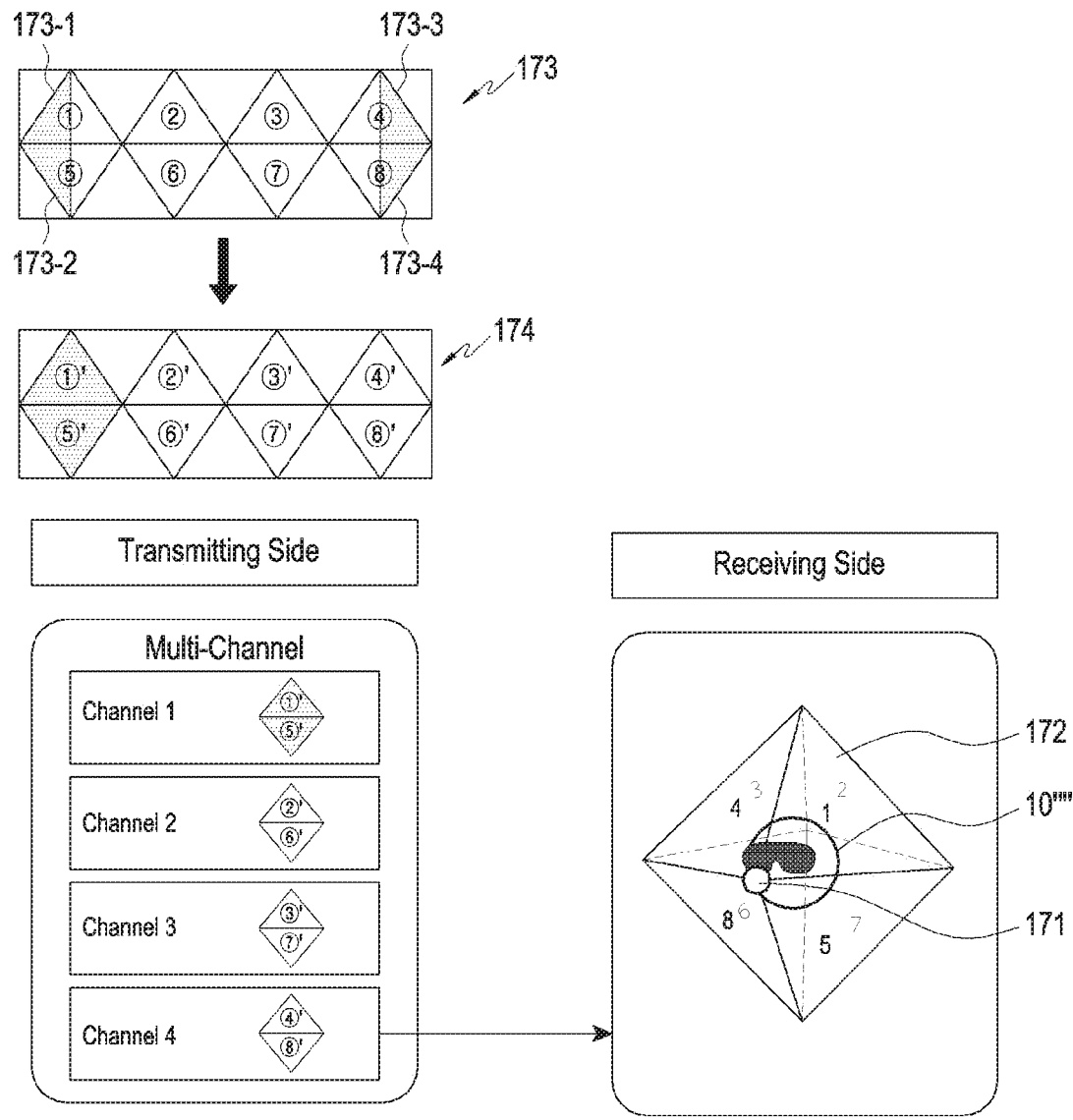
FIG. 17 illustrates a method of selecting image areas corresponding to viewing angle information according to various embodiments of the disclosure.

FIG. 13 illustrates a method of selecting image areas corresponding to viewing angle information according to various embodiments of the disclosure; FIG. 14 illustrates a method of selecting image areas corresponding to viewing angle information according to various embodiments of the disclosure; FIG. 15 illustrates a method of selecting image areas corresponding to viewing angle information according to various embodiments of the disclosure; FIG. 16 illustrates a method of selecting image areas corresponding to viewing angle information according to various embodiments of the disclosure; FIG. 17 illustrates a method of selecting image areas corresponding to viewing angle information according to various embodiments of the disclosure.

Hereinafter, various embodiments of selecting an image area corresponding to viewing angle information from among a plurality of image areas included in an input frame and transmitting the image area through a transmission channel corresponding thereto will be described with reference to FIGS. 13 to 17. Hereinafter, it is assumed that the size of the viewing angle included in the viewing angle information is 30 degrees in FIGS. 13 to 17.

Referring to FIG. 13, the center location of a viewing angle of a user 10 is on a point 131 at which faces 1, 4, 5, and 8 of a regular octahedron 132 meet each other. Accordingly, the viewing angle of the user 10 reaches faces 1, 4, 5, and 8 of a regular octahedron 132. In this case, the processor 430 may determine that a plurality of image areas corresponding to viewing angle information of the user are faces 1, 4, 5, and 8 of a regular octahedron 132. Further, the processor 430 may transmit faces 1, 4, 5, and 8 of a regular octahedron 132 and the images through transmission channels (channels 1, 4, 5, and 8) that match faces 1, 4, 5, and 8 of a regular octahedron 132.

Referring to FIG. 14, the center location of a viewing angle of a user 10' is on a point 141 at which faces 3, 4, 7, and 8 of a regular octahedron 143 meet each other. Accordingly, the viewing angle of the user 10' reaches faces 3, 4, 7, and 8 of the regular octahedron 143. In this case, the processor 430 may determine that a plurality of image areas corresponding to viewing angle information of the user are faces 3, 4, 7, and 8 of the regular octahedron 142. Further, the processor 430 may transmit faces 3, 4, 7, and 8 of the regular octahedron 142 and the images through transmission channels (channels 3, 4, 7, and 8) that match faces 3, 4, 7, and 8 of the regular octahedron 142.

FIG. 15 illustrates an embodiment in which the number of transmission channels is half the number of transmission channels of FIG. 13 or 14. Referring to FIG. 15, the center location of a viewing angle of a user 10" is on a point 151 at which faces 1, 4, 5, and 8 of a regular octahedron 152 meet each other. Accordingly, the viewing angle of the user 10" reaches faces 1, 4, 5, and 8 of the regular octahedron 152. In this case, the processor 430 may determine that a plurality of image areas corresponding to viewing angle information of the user are faces 1, 4, 5, and 8 of the regular octahedron 152. Here, since faces 1 and 5 of the regular octahedron 132 match transmission channel 1 and faces 4 and 8 of the regular octahedron 132 match transmission channel 4, the processor 430 may transmit faces 1 and 5 of the regular octahedron 132 through transmission channel 1 and faces 4 and 8 of the regular octahedron 132 through transmission channel 4.

Referring to FIG. 16, the center location of a viewing angle of a user 10''' is on the middle point 161 at which faces 4 and 8 of a regular octahedron 162 meet each other. Accordingly, the viewing angle of the user 10''' reaches faces 4 and 8 of the regular octahedron 162. In this case, the processor 430 may determine that a plurality of image areas corresponding to viewing angle information of the user are faces 4 and 8 of the regular octahedron 162. Here, since faces 4 and 8 of the octahedron 162 match transmission channel 4, the processor 430 may transmit images of faces 4 and 8 of the regular octahedron 162 through transmission channel 4.

Referring to FIG. 17, the center location of a viewing angle of a user 10'''' is on a point 171 at which faces 1, 4, 5, and 8 of a regular octahedron 172 meet each other. Accordingly, the viewing angle of the user 10'''' reaches faces 1, 4, 5, and 8 of the regular octahedron 172. However, the processor 430 may pass through a process of minimizing an image area to be transmitted. According to an embodiment, considering a viewing angle of 30 degrees, areas required to implement an image corresponding to the viewing angle in an input frame 173 may be parts 173-1 to 173-4 of faces 1, 4, 5, and 8. Accordingly, the processor 430 may generate new image areas (face 1' and face 5' of an input frame 174) including the parts 173-1 to 173-4 of faces 1, 4, 5, and 8 which are areas required to implement the image corresponding to the viewing angle. In this case, the processor 430 may transmit images of face 1' and face 5' of the input frame 174 through channel 1 that matches face 1' and face 5' of the input frame 174. As described above, according to the embodiment of FIG. 17, the processor 430 may acquire the same effect as that of the embodiment of FIG. 15 by transmitting image data corresponding to only half the image data transmitted in the embodiment of FIG. 15.

As described in the above embodiments, it is possible to significantly reduce an amount of data to be transmitted to the receiving end (for example, the second image processing device 500) by transmitting only some areas corresponding to viewing angle information of the user among a plurality of image areas included in the input frame. In other words, the disclosure has an effect of transmitting an amount of data significantly smaller than an amount of data transmitted for all of a plurality of image areas included in the input frame (transmitting only ½ of data in FIGS. 13 to 15 and only ¼ of data in FIGS. 16 and 17 compared to transmission of data of all of a plurality of image areas) and providing all image sources required for providing a view within a range of the viewing angle of the user. As described above, as the amount of data to be transmitted to the receiving end is significantly reduced, wasting of transmission resources such as bandwidths and power can be greatly reduced and a processing rate of content images can be greatly increased.

Meanwhile, according to another embodiment, viewing angle information may include an indicator indicating at least one image area corresponding to the field of view of the user among a plurality of image areas.

For example, it is assumed that a plurality of image areas included in the input frame is numbered from 1 to 8. In this case, viewing angle information may include indicators indicating image areas 1 to 4 corresponding to the field of view of the user among the plurality of images included in the input frame.

Meanwhile, the processor 430 may transmit the plurality of image areas included in the input frame through different transmission channels. Specifically, the processor 430 may differently set bandwidths for a plurality of transmission channels that match the plurality of image areas, respectively.

To this end, the processor 430 may transmit image areas corresponding to viewing angle information among the plurality of image areas included in the input frame with different qualities (for example, resolutions or FPS). This is because the receiving end for rendering and displaying received image areas may increase image processing efficiency by rendering a high-resolution image for the central area of a user's eyes and rendering a relatively lower-resolution image for an area far from the center. The technology includes, for example, Foveated Rendering (hereinafter, referred to as FR) technology in which resolutions of an area close to the center of a user's eyes and an area far therefrom are differently rendered. Since the technology has been widely known in the art, a detailed description thereof will be omitted herein.

According to an embodiment, when the number of image areas corresponding to viewing angle information among a plurality of image areas is plural, a quality of a farther image area than an image area corresponding to the center location of the viewing angle of the user among the image areas corresponding to the viewing angle information among the plurality of image areas may be set to be lower than a preset value and then transmitted. The preset value may be, for example, a preset resolution value, a preset FPS value, or a preset bit rate value.

When the quality is a resolution, various schemes may be applied to transmit a plurality of image areas with different resolutions in consideration of the center location the field of view of the user. For example, there is a method of storing a high-resolution input frame and a low-resolution input frame together, selecting an image area corresponding to the center of the field of view of the user from the high-resolution input frame, selecting an image area far from the center of the field of view of the user from the low-resolution input frame, and transmitting the selected image areas. Such a method may be implemented using, for example, Dynamic Adaptive Streaming over HTTP (DASH) and streaming schemes. In another example, when the input frame is pre-stored with a single resolution, the image may be spatially compressed using a scheme such as tri-linear interpolation or low-pass filtering in a scaling process to reduce bandwidth and then transmit the image.

According to another embodiment, an image corresponding to an area closer to the center of the field of view of the user may be transmitted with a relatively lower FPS compared to an image corresponding to an area farther from the center of the field of view of the user while a resolution of the input frame is maintained.

According to another embodiment, images may be transmitted after a lower resolution and a lower FPS are applied to an image corresponding to an area farther from the center of the user compared to an image corresponding to an area closer to the center of the field of view of the user.

As described above, according to the distance from the center of the field of view of the user, the quality of the transmitted image area may be changed. Hereinafter, an embodiment thereof will be described in detail with reference to FIGS. 18A to 19B.

Figure 18A:
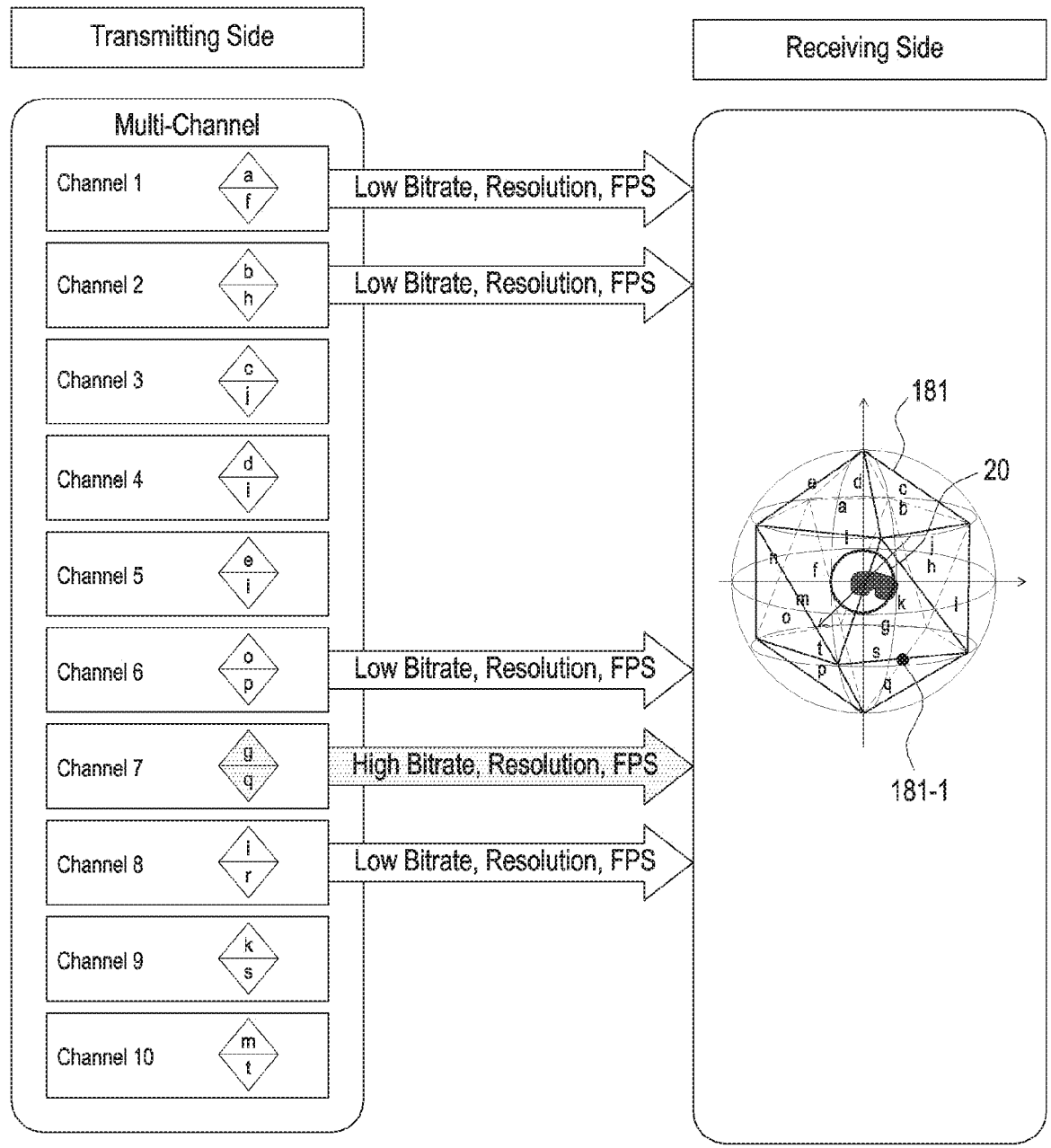
FIG. 18A illustrates a method of processing a plurality of image areas according to various embodiments of the disclosure.
Figure 18B:
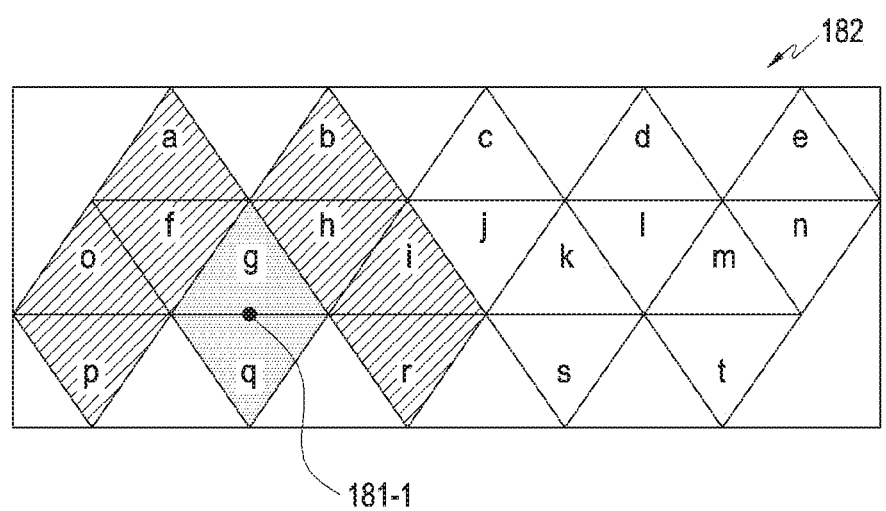
FIG. 18B illustrates a method of processing a plurality of image areas according to various embodiments of the disclosure.

FIG. 18A illustrates a method of processing a plurality of image areas according to various embodiments of the disclosure; FIG. 18B illustrates a method of processing a plurality of image areas according to various embodiments of the disclosure;

Referring to FIG. 18A, the center of the line of sight of a user 20 faces a point 181-1. Here, it is assumed that faces of a regular icosahedron 181 which the line of sight of the user 20 reaches are a, f, b, h, o, p, g, q, i, and r. It is assumed that faces corresponding to the center of the line of sight of the user 20 are g and q and faces corresponding to a relatively long distance from the center of the line of sight are a, b, o, f, h, i, p, and r.

In this case, the processor 430 may process image areas g and q in an input frame 182 with a high resolution, a high bit rate, or a high FPS. Further, the processor 430 may process image areas a, b, o, f, h, i, p, and r with a low resolution, a low bit rate, or a low FPS through channels 1, 2, 6, and 8.

Unlike the embodiment illustrated in FIGS. 18A and 18B, the importance of image areas may be preset and the plurality of image areas may be processed in different ways, which will be described with reference to FIGS. 19A and 19B.

Figure 19A:
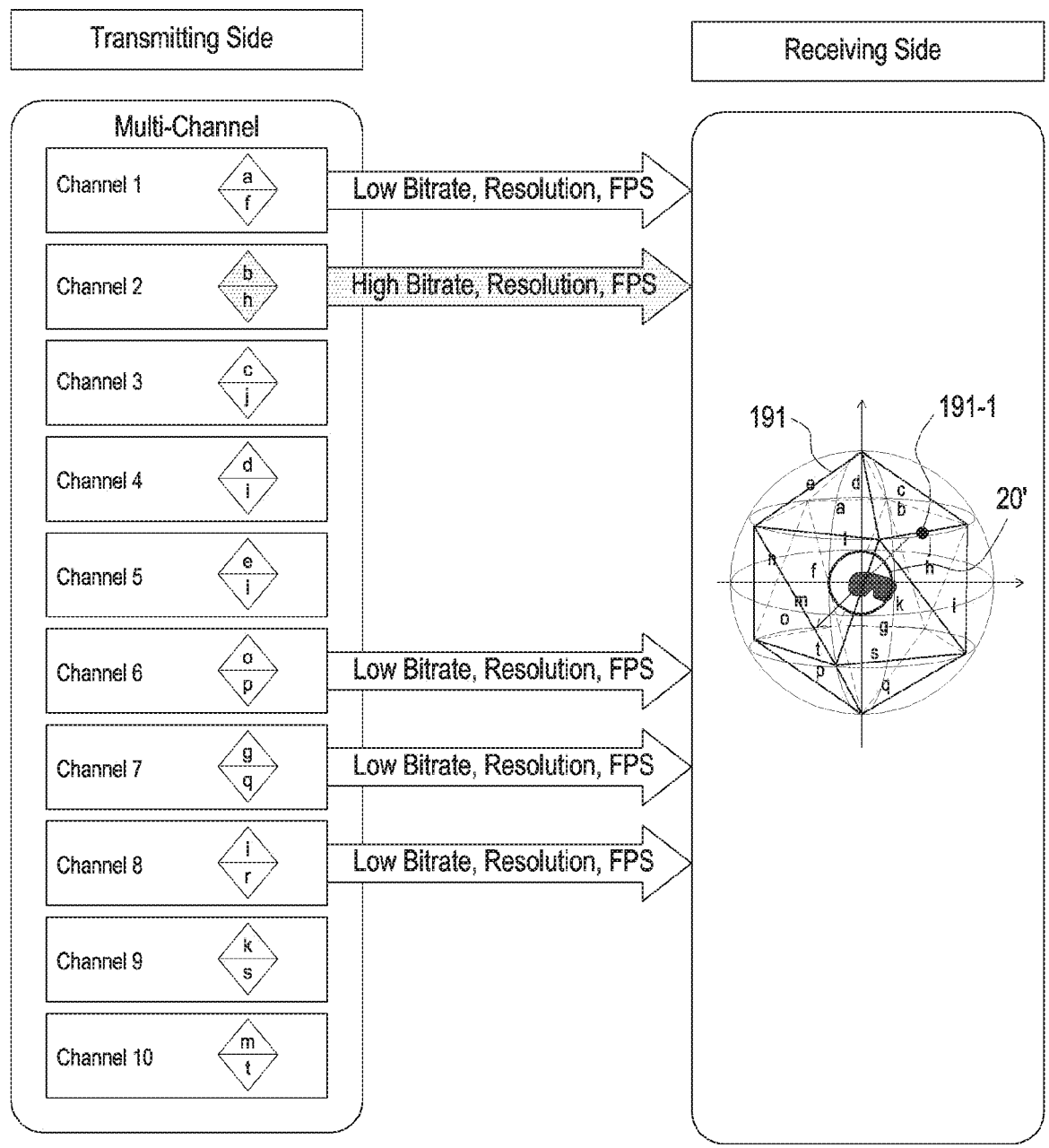
FIG. 19A illustrates a method of processing a plurality of image areas according to various embodiments of the disclosure.
Figure 19B:
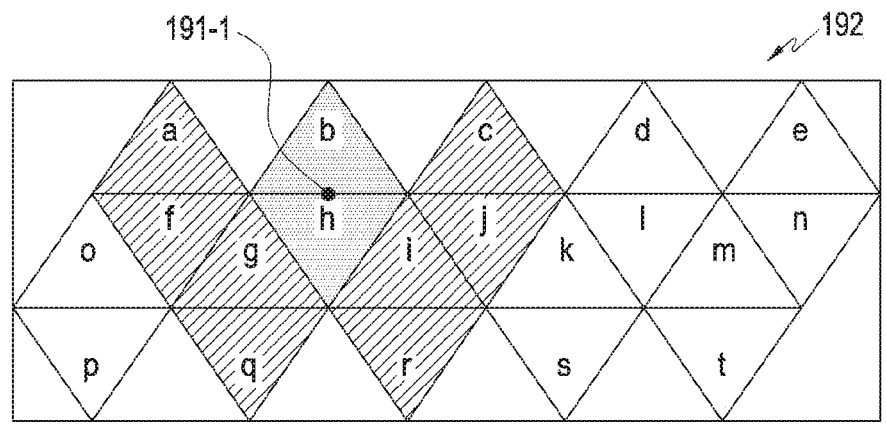
FIG. 19B illustrates a method of processing a plurality of image areas according to various embodiments of the disclosure.

FIG. 19A illustrates a method of processing a plurality of image areas according to various embodiments of the disclosure; FIG. 19B illustrates a method of processing a plurality of image areas according to various embodiments of the disclosure;

Referring to FIG. 19A, an area having a high importance may be preset. Specifically, the viewing angle information may further include importance information of at least one image area corresponding to the field of view of the user among a plurality of image areas. In this case, when the number of image areas corresponding to viewing angle information among a plurality of image areas is plural, the processor 430 may set a quality of image data of an image area having a low importance among the image areas corresponding to the viewing angle information to be lower than a preset value and then transmit the same. The preset value may be, for example, a preset resolution value, a preset FPS value, or a preset bit rate value.

For example, a reference point 191-1 of an area having a high importance may be set in a regular icosahedron 191. In this case, the line of sight of the user 20' and the location of the reference point 191-1 can be different from each other. It is assumed that faces of the regular icosahedron 191-1 having a high importance are b and h and faces which are to be transmitted but have a relatively low importance are a, c, f, g, i, j, q, and r.

In this case, the processor 430 may process image areas b and h in an input frame 192 with a high resolution, a high bit rate, or a high FPS through channel 2. Further, the processor 430 may process image areas a, c, f, g, i, j, and p with a low resolution, a low bit rate, or a low FPS through channels 1, 3, 7, and 8.

Meanwhile, the processor 430 may generate and transmit metadata on at least one transmitted image area.

According to an embodiment, metadata may include at least one piece of unique Identifier (ID) information of content, information on the plurality of transmission channels, type information of a polyhedron corresponding to the plurality of image areas, matching information between the plurality of transmission channels and the plurality of image areas, and quality information of image data of at least one of the plurality of image areas corresponding to the viewing angle information.

The unique ID information of content may be ID information of content including the input frame. The information on the plurality of transmission channels may include information on the number of the plurality of transmission channels and information on types of the plurality of transmission channels. The type information of the polyhedron corresponding to the plurality of image areas may be set as "01" when the polyhedron corresponding to the plurality of image areas is a regular hexahedron and set as "11" when the polyhedron corresponding to the plurality of image areas is a regular icosahedron. The matching information between the plurality of transmission channels and the plurality of image areas may be, for example, the table 90 of FIG. 9. The quality information of image data of at least one of the plurality of image areas corresponding to the viewing angle information may include at least one piece of resolution information, FPS information, and bit rate information of at least one of the plurality of image areas corresponding to the viewing angle information.

Meanwhile, the processor 430 may transmit audio data of content. When the receiving end, for example the second image processing device 500, processes images, synchronization of the plurality of transmission channels may be determined according to synchronization of the audio data.

In the above description, each element of the first image processing device 400 has been described in detail. Hereinafter, each element of the second image processing device 500 will be described in detail. However, a detailed description that overlaps the description of the first image processing device 400 will be omitted.

Figure 20:
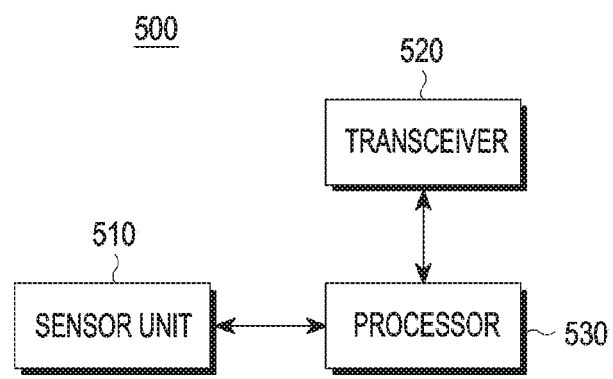
FIG. 20 is a block diagram illustrating a second image processing device according to various embodiments of the disclosure.

FIG. 20 is a block diagram illustrating the second image processing device 500 according to various embodiments of the disclosure.

The second image processing device 500 according to an embodiment of the disclosure may include a sensor unit 510, a transceiver 520, and a processor 530.

The sensor unit 530 senses the line of sight of the user. Specifically, the sensor unit 530 senses a direction of the line of sight of the user. According to an embodiment, the sensor unit 530 may include a camera module. For example, a user's pupils may be tracked using the camera sensor. According to another embodiment, the sensor unit 530 may sense a direction of the line of sight of the user by sensing the iris and the pupil. In this case, the sensor unit 530 may sense the iris and the pupil through an Infrared (IR) sensor. The sensor unit 530 may sensor a user's motion. To this end, the sensor unit 530 may include one or more of a camera module, an acceleration sensor, and a gyro sensor. For example, motion of the user's head or hand may be sensed through an HMD, a remote controller, or an acceleration sensor or a gyro sensor installed in a mobile device.

The transceiver 520 may transmit viewing angle information generated on the basis of the sensed field of view of the user and receive at least one of metadata including arrangement attributes of a plurality of image areas included in an image frame.

The processor 530 overall controls the process of processing images by the second image processing device 500.

According to an embodiment, the processor 530 may generate viewing angle information of the user sensed by the sensor unit 510. For example, the viewing angle information may include the size of the viewing angle of the user and center coordinates of the viewing angle. In another example, the processor 530 may determine an image area corresponding to a field of view of the user among a plurality of image areas included in the input frame stored in the first image processing device 400 on the basis of the size of the viewing angle of the user and the center coordinates of the viewing angle, generate viewing angle information including an indicator indicating the corresponding image area, and transmit the viewing angle information to the first image processing device 400.

According to another embodiment, the processor 530 may receive at least one image area corresponding to viewing angle information among a plurality of image areas through at least one of a plurality of transmission channels that match the plurality of image areas, respectively, map at least one image area to corresponding faces among the faces of the polyhedron on the basis of metadata, and render an output frame.

In this case, the processor 530 may map at least one image area to corresponding faces among the faces of the polyhedron based on the metadata received from the transceiver 520 and render the output frame. According to an embodiment, metadata may include at least one piece of unique Identifier (ID) information of content (a unique ID of a content source), information on a plurality of transmission channels (for example, the number of a plurality of transmission channels), type information of a polyhedron corresponding to a plurality of image areas (for example, information related to mapping geometry such as an octahedron or an icosahedron), matching information between a plurality of transmission channels and a plurality of image areas, and quality information of image data of at least one of a plurality of image areas corresponding to viewing angle information (for example, a resolution value such as 480 p, 780 p, or 1080 p). A rendering procedure of the processor 530 will be described through an embodiment with reference to FIG. 21.

Figure 21:
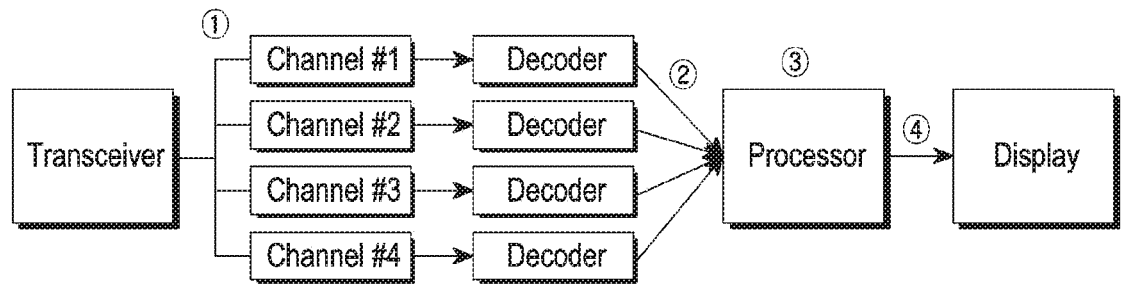
FIG. 21 illustrates a rendering method according to an embodiment of the disclosure.
Figure 21:
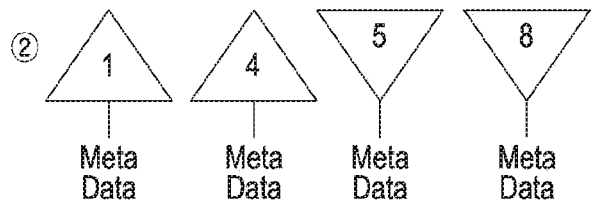
Figure 21:
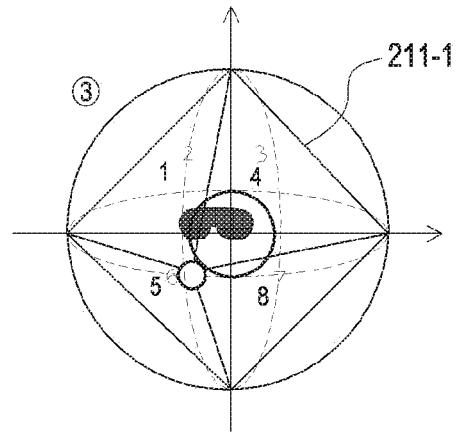
Figure 21:
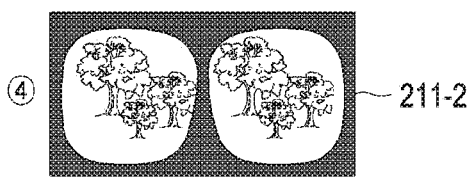

FIG. 21 illustrates a rendering method according to an embodiment of the disclosure.

Referring to FIG. 21, in ①, image data is received through a plurality of transmission channels. In ②, a plurality of image areas 1, 4, 5, and 8 are decoded by a plurality of decoders. In ③, the processor 530 maps the plurality of decoded image areas 1, 4, 5, and 8 to faces 1, 4, 5, and 8 of a regular octahedron 211-1 and performs rendering. In this case, if the image quality (for example, resolution) is low, an aliasing problem may occur and thus schemes such as spatial anti-aliasing, temporal anti-aliasing, motion-blur may be used. In ④, the processor 530 displays a rendered screen 211-2.

In the embodiment, the plurality of image areas may be image areas of the two-dimensional image to which respective faces of the three-dimensional polyhedron are mapped, and the preset arrangement attributes may be attributes indicating the mapping relation between images of the respective faces of the three-dimensional polyhedron and the plurality of image areas. According to an embodiment, it is assumed that, when the three-dimensional polyhedron is a regular octahedron, faces 1 to 8 of the regular octahedron numbered by positive integers are mapped to a plurality of image areas a to h included in the two-dimensional image frame. In this case, the preset arrangement attributes may be the mapping relation between the respective faces of the three-dimensional polyhedron and the plurality of image areas included in the two-dimensional image frame.

The arrangement attributes may vary. This is because types of the polyhedron may be various such as a regular tetrahedron or a regular octahedron and the respective faces of the polyhedron may be mapped to the two-dimensional frame in various methods.

According to an embodiment, the arrangement method of the plurality of image areas in FIG. 8B may be different from the arrangement method of the plurality of image areas in FIG. 8C. In this case, the array method of the plurality of image areas in FIG. 8B may be defined as array attributes "001" and array attributes of the plurality of image areas in FIG. 8C may be defined as array attributes "011".

Here, the predefined arrangement attributes may be pre-stored in each of the first image processing device 400 and the second image processing device 500 or the arrangement attributes thereof may be exchanged. For example, when the first image processing device 400 transmits data of at least one image area and arrangement attributes together, the second image processing device 500 may map at least one image area to a predefined polyhedron on the basis of the received arrangement attributes.

In the example, the viewing angle information may include indicators indicating at least one image area corresponding to the viewing angle information among a plurality of image areas according to an embodiment. In this case, the viewing angle information may further include importance information of at least one image area corresponding to a field of view of the user among the plurality of image areas. When the number of image areas corresponding to the viewing angle information among the plurality of image areas is plural, a quality of image data of an image area having a low importance among the image areas corresponding to the viewing angle information may be set to be lower than a preset value and then received.

According to another embodiment, the viewing angle information may include information on the size of the viewing angle of the user and information on the center location of the viewing angle of the user. When the number of image areas corresponding to viewing angle information among the plurality of image areas is plural, a quality of an image area farther than an image area corresponding to the center location of the viewing angle of the user among the image areas corresponding to the viewing angle information may be set to be lower than a preset value and then transmitted Meanwhile, the transceiver 520 may receive audio data of content. In this case, the processor 530 may determine synchronization of each of the plurality of transmission channels according to synchronization of audio data.

In the above description, each element of the first image processing device 400 and the second image processing device 500 has been described in detail. Hereinafter, an example of the image processing system will be described with reference to FIG. 22.

Figure 22:
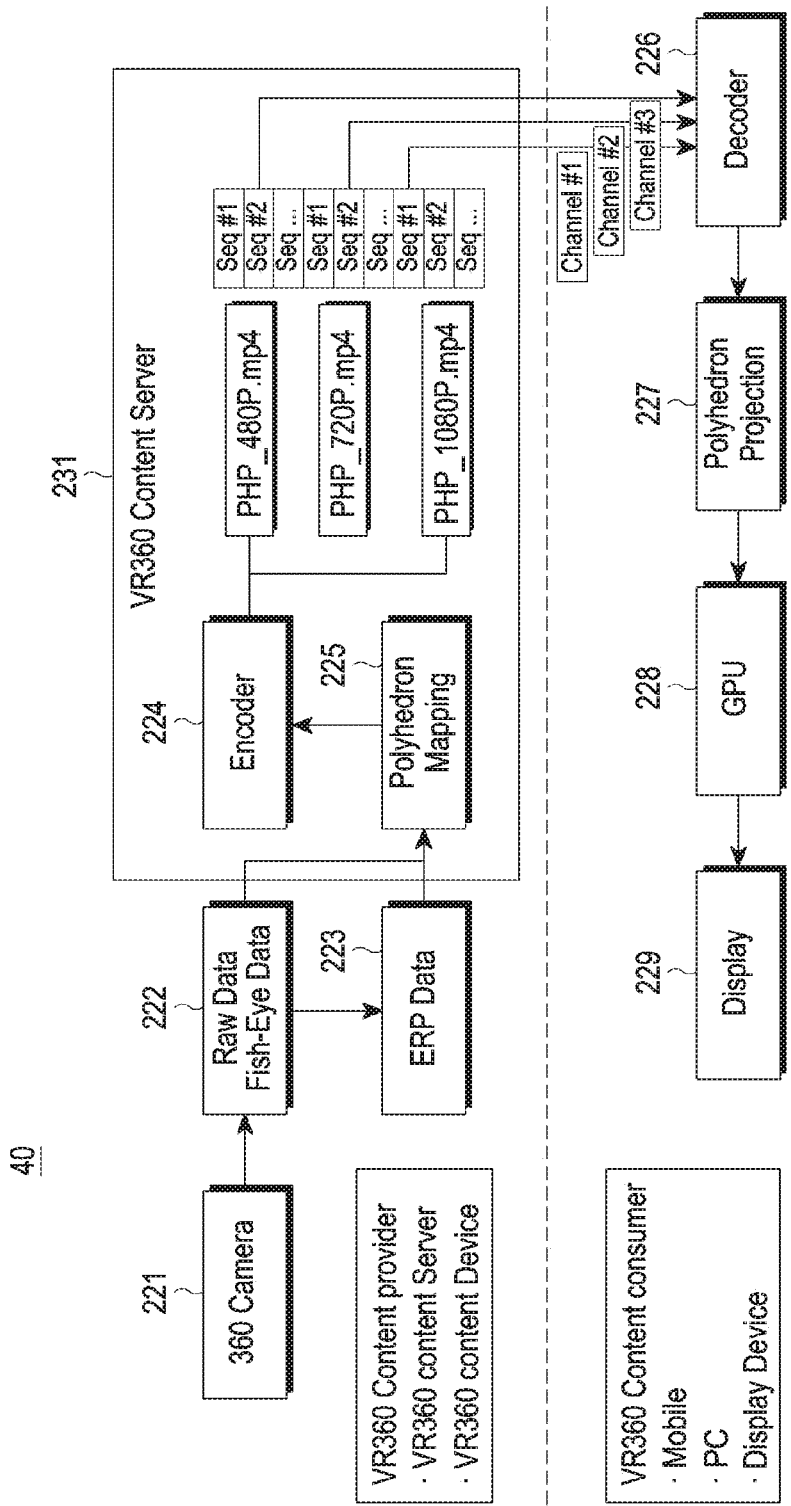
FIG. 22 is a block diagram illustrating an example of an image processing system according to various embodiments of the disclosure.

FIG. 22 is a block diagram illustrating an example of the image processing system according to various embodiments of the disclosure.

Referring to FIG. 22, a VR 360 content provider (for example, a VR 360 content server or a VR 360 camera) may process images in the following order. First, a 360 camera may capture omni-directional images in step 221. In this case, the omni-directional images may be fisheye images in step 222. The fisheye images may be mapped to ERP images in step 223. The fisheye images or the ERP images may be mapped to a polyhedron and then mapped to a two-dimensional image in S225 (transcoding step). The mapped polyhedron may be encoded (for example, JPG or MPG) in step 231 and images of respective faces of the encoded polyhedron may be separately stored. The images of the respective faces of the polyhedron which have been encoded and separately stored may be set to be different resolutions, for example, 480 p, 720 p, and 1080 p and may be transmitted through at least one channel.

The VR 360 content consumer (for example, a mobile device, a personal computer (PC), or a display device) may process at least one image received from the VR content provider in the following order. First, a data stream corresponding to at least one image received from at least one channel is decoded. At least one decoded image may be mapped to a polyhedron in S227 and the mapped polyhedron may be rendered by a GPU and displayed in S228 and S229. In this case, the mapping of the polyhedron may be performed using metadata received together with at least one image. The metadata may include a type of a polyhedron, a sub type indicating arrangement attributes of at least one image in a frame, and geometry information including a mapping relation between at least one image and a polyhedron. According to an embodiment, the metadata may be transmitted using EssentialProperty@value defined in DASH or transmitted while being defined in a SupplementalProperty@value parameter, and representation of the metadata may be expressed as, for example, <EssentialPropertyschemeIdUri="urn:mpeg:dash:vrd:
2016" value="0,8,1,0,3"/>.

According to an embodiment of the disclosure, when received images are mapped to faces through a GPU, the GPU may bind the received images with texture, make the faces to be mapped to a single triangle, and then designate texture coordinates corresponding to points which are vertexes of each triangle, so as to draw images. Filter methods used for mapping texture may include a nearest neighbor method, a linear method, a bi-linear method, a tri-linear method, and a sinc method, and the methods can be selectively used in consideration of a performance of the image reception device on the reception side. For example, a linear mapping method may be used when a performance of an image reception device on a receiving side is relatively low, and a bi-linear mapping method may be used when a performance is relatively high. Further, when a quality (for example, resolution) of an original image is low, it takes less time for mapping, so that a tri-linear method having more complex calculations may be used.

Of course, the disclosure is not limited to the above-described embodiment. For example, the mapping method may use methods basically provided by a GPU manufacturer or may be developed directly by a developing company which develops a decoding module in the form of a post-filter of a GPU shader.

When a quality of received image data of an image area is set to be low, aliasing may occur. A problem with aliasing may be solved through the aforementioned various schemes (spatial/temporal anti-aliasing and motion-blur). A sense of difference that may be generated between a high-quality image area and a low-quality image area may be resolved through various types of blending methods (for example, the blending methods include smooth step, linear, and exponential).

Further, it is possible to include only a minimum of triangles in a viewing angle by rotating a figure with respect to the center of the viewing angle. Such a method may reduce not only an amount of data transmitted by the transmitter but also the number of triangle faces which should be decoded, thereby resulting in a reduction in an amount of rendering calculations.

Figure 23:
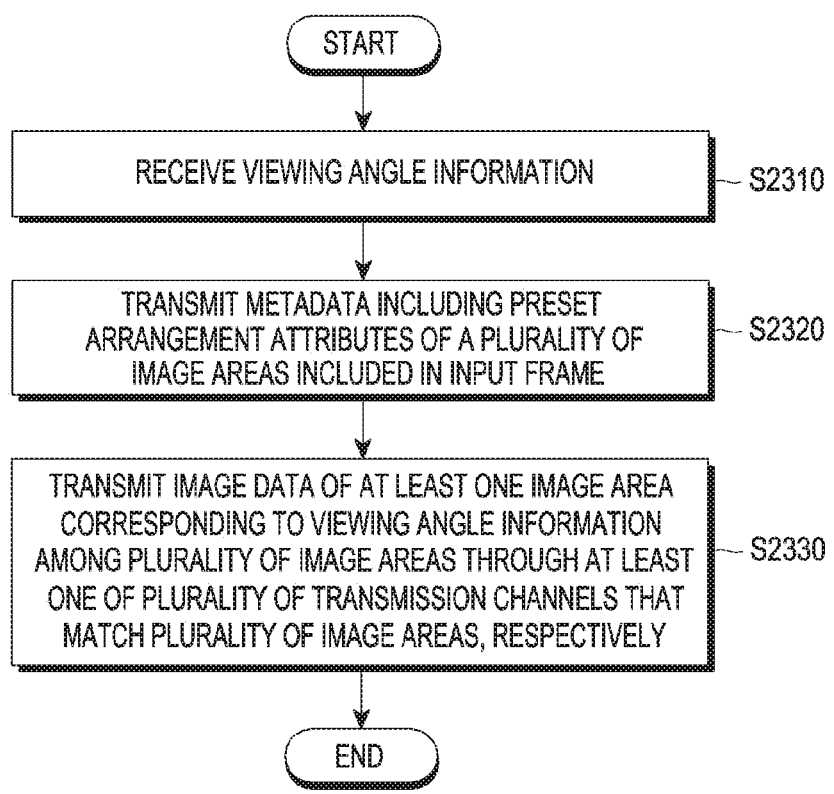
FIG. 23 is a flowchart illustrating an image processing method according to various embodiments of the disclosure.

FIG. 23 is a flowchart illustrating an image processing method according to various embodiments of the disclosure.

First, the image processing method may include receiving viewing angle information in S2310, transmitting metadata including preset arrangement attributes of a plurality of image areas included in an input frame in S2320, and transmitting image data of at least one image area corresponding to the viewing angle information among the plurality of image areas through at least one of a plurality of transmission channels that match the plurality of image areas having preset arrangement attributes included in the input frame, respectively in S2330.

The plurality of image areas may be image areas of a two-dimensional image to which images of respective faces of a three-dimensional polyhedron are mapped, and the preset arrangement attributes may be attributes defining an arrangement method of a plurality of image areas in the input frame indicating a mapping relation between the images of the respective faces of the three-dimensional polyhedron and the plurality of image areas.

The viewing angle information may include indicators indicating at least one image area corresponding to a field of view of a user among the plurality of image areas.

The viewing angle information may further include importance information of at least one image area corresponding to the field of view of the user among the plurality of image areas, and when a number of image areas corresponding to the viewing angle information among the plurality of image areas is plural, the process of transmitting the image data may include a process of setting a quality of image data of an image area having a low importance among the image areas corresponding to the viewing angle information to be lower than a preset value and transmitting the image data.

The viewing angle information may include information on a size of the viewing angle of the user and information on a center location of the viewing angle of the user.

The process of transmitting the image data may include, when a number of image areas corresponding to the viewing angle information among the plurality of image areas is plural, setting a quality of image data of an image area relatively farther from the center location of the viewing angle of the user among the image areas corresponding to the viewing angle information to be lower than a preset value and transmitting the image data.

The metadata may include at least one piece of unique Identifier (ID) information of content, information on the plurality of transmission channels, type information of a polyhedron corresponding to the plurality of image areas, matching information between the plurality of transmission channels and the plurality of image areas, and quality information of at least one image data among the plurality of image areas corresponding to the viewing angle information.

Meanwhile, the image processing method may further include a process of transmitting audio data of content and synchronization of each of the plurality of transmission channels may be determined according to synchronization of the audio data.

Figure 24:
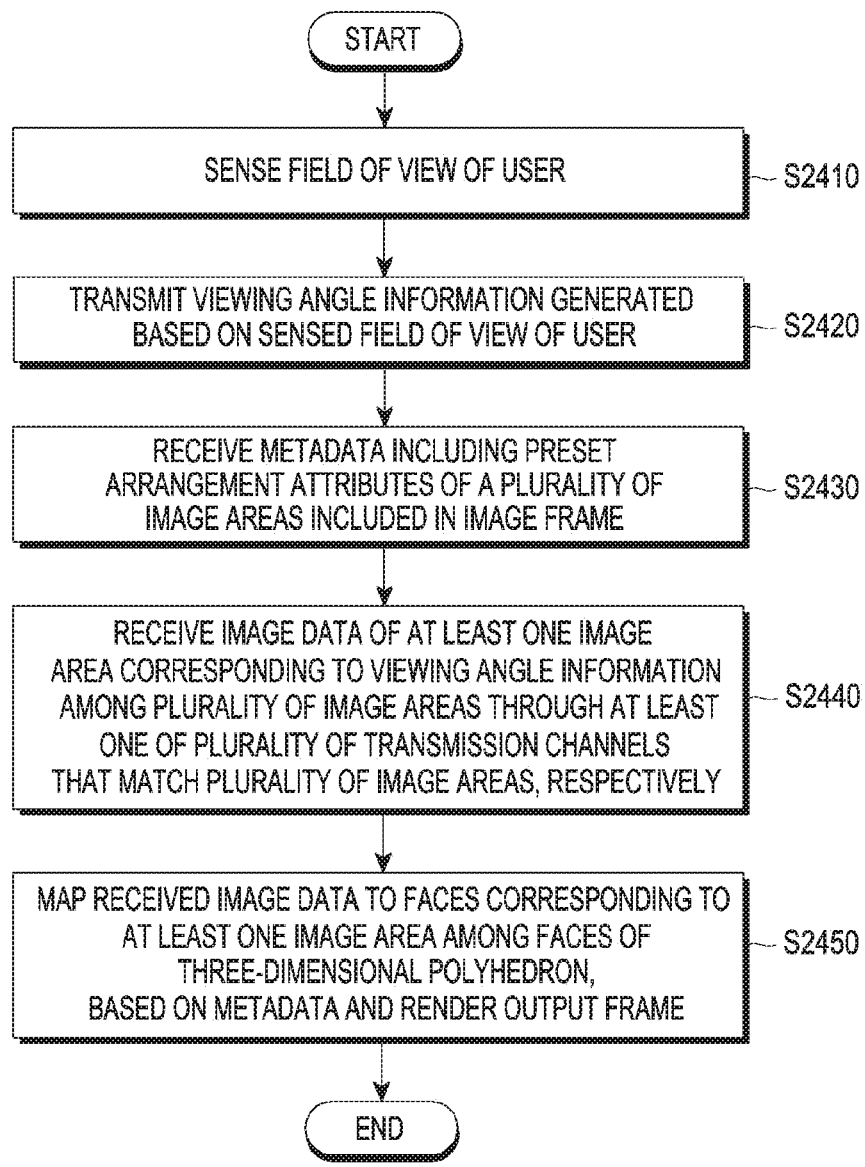
FIG. 24 is a flowchart illustrating an image processing method according to various embodiments of the disclosure.

FIG. 24 is a flowchart illustrating an image processing method according to various embodiments of the disclosure.

First, the image processing method may include sensing a field of view of a user in S2410, transmitting viewing angle information generated based on the sensed field of view of the user in S2420, receiving metadata including preset arrangement attributes of a plurality of image areas included in an image frame in S2430, receiving image data of at least one image area corresponding to the viewing angle information among the plurality of image areas through at least one of a plurality of transmission channels that match the plurality of image areas, respectively in S2440, and mapping the received image data to faces corresponding to the at least one image area among faces of a three-dimensional polyhedron, based on the metadata and rendering an output frame in S2450.

The plurality of image areas may be image areas of a two-dimensional image to which images of respective faces of a three-dimensional polyhedron are mapped, and the preset arrangement attributes may indicate a mapping relation between the images of the respective faces of the three-dimensional polyhedron and the plurality of image areas.

In this case, the viewing angle information may include indicators indicating at least one image area corresponding to the viewing angle information among the plurality of image areas.

The viewing angle information may further include importance information of at least one image area corresponding to a field of view of a user among the plurality of image areas, and when a number of image areas corresponding to the viewing angle information among the plurality of image areas is plural, a quality of image data of an image area having a low importance among the image areas corresponding to the viewing angle information may be set to be lower than a preset value and received.

The viewing angle information may include information on a size of the viewing angle of the user and information on a center location of the viewing angle of the user.

When a number of image areas corresponding to the viewing angle information among the plurality of image areas is plural, a quality of image data of an image area relatively farther from a center location of the viewing angle of the user among the image areas corresponding to the viewing angle information may be set to be lower than a preset value.

In this case, the metadata may include at least one piece of unique Identifier (ID) information of content, information on the plurality of transmission channels, type information of a polyhedron corresponding to the plurality of image areas, matching information between the plurality of transmission channels and the plurality of image areas, and quality information of at least one image data among the plurality of image areas corresponding to the viewing angle information.

Meanwhile, the image processing method may further include a process of receiving audio data of content and synchronization of each of the plurality of transmission channels may be determined according to synchronization of the audio data.

Meanwhile, the image processing method according to various embodiments of the disclosure may be provided to each server or devices to be executed by a processor while being implemented by a computer-executable program code and stored in various non-transitory computer-readable media.

For example, a non-transitory computer readable medium storing a program for performing a process of receiving viewing angle information, a process of transmitting metadata including preset arrangement attributes of a plurality of image areas included in an input frame, and a process of transmitting image data of at least one image area corresponding to viewing angle information among the plurality of image areas through at least one of a plurality of transmission channels that match the plurality of image areas, respectively may be provided.

In another example, a non-transitory computer readable medium storing a program for performing a process of sensing a field of view of a user, a process of transmitting viewing angle information generated based on the sensed field of view of the user, a process of receiving metadata including preset arrangement attributes of a plurality of image areas included in an image frame, a process of receiving image data of at least one image area corresponding to the viewing angle information among the plurality of image areas through at least one of a plurality of transmission channels that match the plurality of image areas, respectively, and a process of mapping the received image data to faces corresponding to the at least one image area among faces of a three-dimensional polyhedron, based on the metadata and rendering an output frame may be provided.

A non-transitory computer-readable medium refers to a medium which semi-permanently stores data and can be read by a device rather than a medium which stores data for a short time, such as register, cache, or memory. Specifically, the aforementioned various applications or programs may be provided while being stored in a non-transitory computer-readable medium, such as a CD, a DVD, a hard disc, a blu-ray disc, a USB, a memory card, or a ROM.

Although specific exemplary embodiments of the disclosure have been illustrated and described, it should be appreciated that the disclosure is not limited thereto. It will be apparent that various modifications and changes may be made by those skilled in the art without departing from the scope of the disclosure as defined by the appended claims, and these modifications and changes should not be construed separately from the technical idea or view of the disclosure.

The invention claimed is:

1. An apparatus for processing images, the apparatus comprising:
a storage unit;
a transceiver; and
a processor configured to:
control the storage unit to store a two-dimensional image including a plurality of image areas and metadata including an arrangement attribute that indicates mapping information between each image area of the plurality of the image areas and each face of a plurality of faces of a three-dimensional polyhedron,
control the transceiver to receive viewing angle information from an external electronic device, and
identify at least one image area corresponding to the viewing angle information among the plurality of the image areas,
control the transceiver to transmit, to the external electronic device, the metadata and image data of the identified at least one image area through at least one of a plurality of transmission channels that match the plurality of image areas,
wherein the two-dimensional image is mapped to an omni-directional image of the three-dimensional polyhedron,
wherein the plurality of image areas of the two-dimensional image are mapped to a plurality of image areas of the omni-directional image corresponding to the plurality of faces of the three-dimensional polyhedron, respectively, and
wherein the image data of the identified at least one image area corresponds to a portion of the plurality of image areas of the omni-directional image.

2. The apparatus of claim 1, wherein the viewing angle information includes indicators indicating the at least one image area corresponding to a field of view of a user among the plurality of image areas.

3. The apparatus of claim 2, wherein the viewing angle information further includes importance information of the at least one image area corresponding to the field of view of the user among the plurality of image areas, and
wherein, when a number of the at least one image area corresponding to the viewing angle information among the plurality of image areas is plural, the processor is configured to:
set a quality of image data of an image area having a low importance among the image areas corresponding to the viewing angle information to be lower than a preset value, and
control the transceiver to transmit the image data.

4. The apparatus of claim 1, wherein the viewing angle information includes first information on a size of the viewing angle of the user and second information on a center location of the viewing angle of the user.

5. The apparatus of claim 4, wherein, when a number of the at least one image area corresponding to the viewing angle information among the plurality of image areas is plural, the processor is configured to:
set a quality of image data of an image area of a location distant from the center location of the viewing angle of the user among the at least one image area corresponding to the viewing angle information to be lower than a preset value, and
control the transceiver to transmit the image data.

6. The apparatus of claim 1, wherein the metadata further includes at least one piece of unique Identifier (ID) information of content, information on the plurality of transmission channels, type information of a polyhedron corresponding to the plurality of image areas, matching information between the plurality of transmission channels and the plurality of image areas, and quality information of at least one image data among the plurality of image areas corresponding to the viewing angle information.

7. The apparatus of claim 1, wherein the processor is configured to:

control the transceiver to further transmit audio data of content, and wherein synchronization of each of the plurality of transmission channels is determined according to synchronization of the audio data.

8. A method of processing images, the method comprising:

controlling a storage unit of an electronic device to store a two-dimensional image comprising a plurality of image areas, and to store metadata comprising an arrangement attribute that indicates mapping information between each of the plurality of the image areas and each of a plurality of faces of a three-dimensional polyhedron;

receiving viewing angle information from an external electronic device;

identifying at least one image area corresponding to the viewing angle information among the plurality of image areas; and transmitting, to the external electronic device, the metadata and image data of the at least one image area corresponding to the viewing angle information among the plurality of image areas through at least one of a plurality of transmission channels that match the plurality of image areas, wherein the two-dimensional image is mapped to an omni-directional image of the three-dimensional polyhedron, wherein the plurality of image areas of the two-dimensional image are mapped to a plurality of image areas of the omni-directional image corresponding to the plurality of faces of the three-dimensional polyhedron, respectively, and wherein the image data of the identified at least one image area corresponds to a portion of the plurality of image areas of the omni-directional image.

9. The method of claim 8, wherein the viewing angle information includes indicators indicating at least one image area corresponding to a field of view of a user among the plurality of image areas.

10. The method of claim 9, wherein the viewing angle information further includes importance information of at least one image area corresponding to the field of view of the user among the plurality of image areas, and wherein, when a number of the at least one image area corresponding to the viewing angle information among the plurality of image areas is plural, the transmitting of the image data comprises:

setting a quality of image data of an image area having a low importance among the at least one image area corresponding to the viewing angle information to be lower than a preset value; and transmitting the image data.

11. The method of claim 8, wherein the viewing angle information includes first information on a size of the viewing angle of the user and second information on a center location of the viewing angle of the user.

12. An apparatus for processing images, the apparatus comprising:

a sensor;

a transceiver; and a processor configured to:

identify a field of view of a user by using the sensor, control the transceiver to transmit viewing angle information generated based on the identified field of view of the user to an external electronic device, control the transceiver to receive, from the external electronic device, metadata including an arrangement attribute included in an image frame and image data of at least one image area corresponding to the viewing angle information among a plurality of image areas through at least one of a plurality of transmission channels that match the plurality of image areas, map the received image data to at least one face corresponding to the at least one image area among a plurality of faces of a three-dimensional polyhedron, based on the metadata, and render an output frame corresponding to at least one part of a three-dimensional image that is mapped to the at least one face corresponding to the at least one image area, wherein the arrangement attribute indicates mapping information between each of the plurality of the image areas and each of the plurality of the faces of a three-dimensional polyhedron, wherein the plurality of image areas are included in a two-dimensional image, wherein the two-dimensional image is mapped to an omni-directional image of the three-dimensional polyhedron, wherein the plurality of image areas of the two-dimensional image are mapped to a plurality of image areas of the omni-directional image corresponding to the plurality of faces of the three-dimensional polyhedron, respectively, and wherein the image data of the at least one image area corresponds to a portion of the plurality of image areas of the omni-directional image.

13. A method of processing images, the method comprising:

identifying a field of view of a user;

transmitting viewing angle information generated based on the identified field of view of the user to an external electronic device;

receiving, from the external electronic device, metadata including an arrangement attribute included in an image frame;

receiving image data of at least one image area corresponding to the viewing angle information among a plurality of image areas through at least one of a plurality of transmission channels that match the plurality of image areas;

mapping the received image data to at least one face corresponding to the at least one image area among a plurality of faces of a three-dimensional polyhedron, based on the metadata; and rendering an output frame corresponding to at least one part of a three-dimensional image that is mapped to at least one face corresponding to the at least one image area, wherein the arrangement attribute indicates mapping information between each of the plurality of the image areas and each of the plurality of the faces of a three-dimensional polyhedron, wherein the plurality of image areas are included in a two-dimensional image, wherein the two-dimensional image is mapped to an omni-directional image of the three-dimensional polyhedron, wherein the plurality of image areas of the two-dimensional image are mapped to a plurality of image areas of the omni-directional image corresponding to the plurality of faces of the three-dimensional polyhedron, respectively, and wherein the image data of the at least one image area corresponds to a portion of the plurality of image areas of the omni-directional image.

\* \* \* \* \*